(12) United States Patent
Negi et al.

(10) Patent No.: US 10,525,938 B2
(45) Date of Patent: Jan. 7, 2020

(54) VEHICLE WIPER DEVICE AND VEHICLE WIPER DEVICE CONTROL METHOD

(71) Applicant: DENSO CORPORATION, Kariya-shi, Aichi (JP)

(72) Inventors: Takafumi Negi, Kosai (JP); Shinichi Okada, Kosai (JP); Keigo Hikida, Kosai (JP); Sho Takano, Kosai (JP); Yoshihisa Banno, Kosai (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/070,529

(22) PCT Filed: Jan. 18, 2017

(86) PCT No.: PCT/JP2017/001478
§ 371 (c)(1),
(2) Date: Jul. 17, 2018

(87) PCT Pub. No.: WO2017/126526
PCT Pub. Date: Jul. 27, 2017

(65) Prior Publication Data
US 2019/0016307 A1  Jan. 17, 2019

(30) Foreign Application Priority Data

Jan. 19, 2016  (JP) .................................. 2016-008053
Sep. 30, 2016  (JP) .................................. 2016-194923

(51) Int. Cl.
*B60S 1/08*   (2006.01)
*B60S 1/28*   (2006.01)
(Continued)

(52) U.S. Cl.
CPC ........... *B60S 1/0896* (2013.01); *B60S 1/0814* (2013.01); *B60S 1/245* (2013.01); *B60S 1/28* (2013.01);
(Continued)

(58) Field of Classification Search
CPC ........ B60S 1/0896; B60S 1/0814; B60S 1/28; B60S 1/524
See application file for complete search history.

(56) References Cited

U.S. PATENT DOCUMENTS

| | | | |
|---|---|---|---|
| 4,707,641 A | 11/1987 | Guerard et al. | |
| 5,301,383 A | 4/1994 | Suzuki | |

(Continued)

FOREIGN PATENT DOCUMENTS

| | | |
|---|---|---|
| JP | S62-113637 A | 5/1987 |
| JP | H01-132446 A | 5/1989 |

(Continued)

OTHER PUBLICATIONS

English language translation of the following: Office action dated Nov. 19, 2019 from the JPO in a Japanese Patent application No. 2016-061778 corresponding to the instant patent application. This office action translation is submitted now in order to supplement the understanding of the cited reference which is being disclosed in the instant Information Disclosure Statement.

*Primary Examiner* — Nicholas K Wiltey
*Assistant Examiner* — Tiffany K Luu
(74) *Attorney, Agent, or Firm* — Solaris Intellectual Property Group, PLLC

(57) ABSTRACT

A vehicle wiper device including (i) a first motor that includes a first output shaft, that rotates the first output shaft to rotate a wiper arm back and forth about a pivot point of the wiper arm, and that causes a wiper blade coupled to a leading end portion of the wiper arm to perform a back and (Continued)

forth wiping operation between an upper return position and a lower return position on a windshield, (ii) a second motor that changes a wiping range on the windshield by the wiper blade, (iii) a rotation angle detector that detects a rotation angle of the first output shaft, and (iv) a controller that controls the second motor according to a rotation angle of the first output shaft detected by the rotation angle detector in a state in which a broad field of view should be secured on a front passenger seat side.

18 Claims, 20 Drawing Sheets

(51) Int. Cl.
*B60S 1/52* (2006.01)
*G01C 21/36* (2006.01)
*G01S 19/51* (2010.01)
*G06K 9/00* (2006.01)
*B62D 15/02* (2006.01)
*B60S 1/34* (2006.01)
*B60S 1/24* (2006.01)

(52) U.S. Cl.
CPC .............. *B60S 1/3409* (2013.01); *B60S 1/524* (2013.01); *G01C 21/36* (2013.01); *G01S 19/51* (2013.01); *G06K 9/00791* (2013.01); *B60S 1/3493* (2013.01); *B60S 1/526* (2013.01); *B62D 15/021* (2013.01)

(56) References Cited

U.S. PATENT DOCUMENTS

| | | | |
|---|---|---|---|
| 2004/0136568 A1* | 7/2004 | Milgram | G06K 9/00798 382/104 |
| 2005/0035926 A1* | 2/2005 | Takenaga | B60S 1/0818 345/8 |
| 2005/0117358 A1* | 6/2005 | Fukawa | B60Q 1/12 362/460 |
| 2009/0248251 A1* | 10/2009 | Sugimoto | B60Q 1/085 701/42 |
| 2014/0298607 A1* | 10/2014 | Yasumoto | B60S 1/522 15/250.04 |

FOREIGN PATENT DOCUMENTS

| | | |
|---|---|---|
| JP | H03-5261 | 1/1991 |
| JP | H11-227572 A | 8/1999 |
| JP | 2000-25578 A | 1/2000 |
| JP | 2003-220929 A | 8/2003 |
| JP | 2005-104337 A | 4/2005 |
| JP | 2005-206032 A | 8/2005 |
| JP | 2012-20625 A | 2/2012 |
| JP | 2012-224231 A | 11/2012 |
| JP | 2014-083993 A | 5/2014 |

* cited by examiner

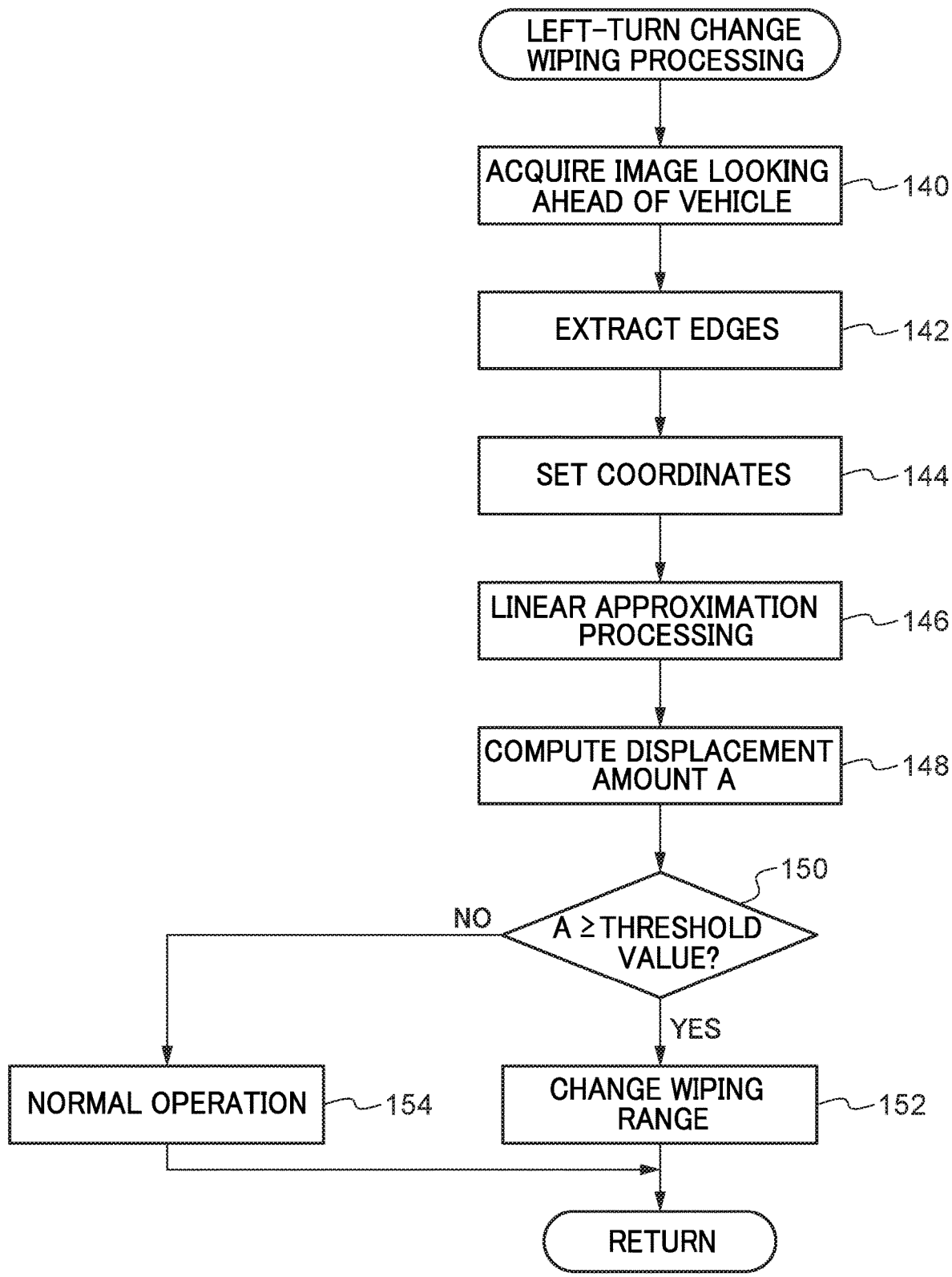

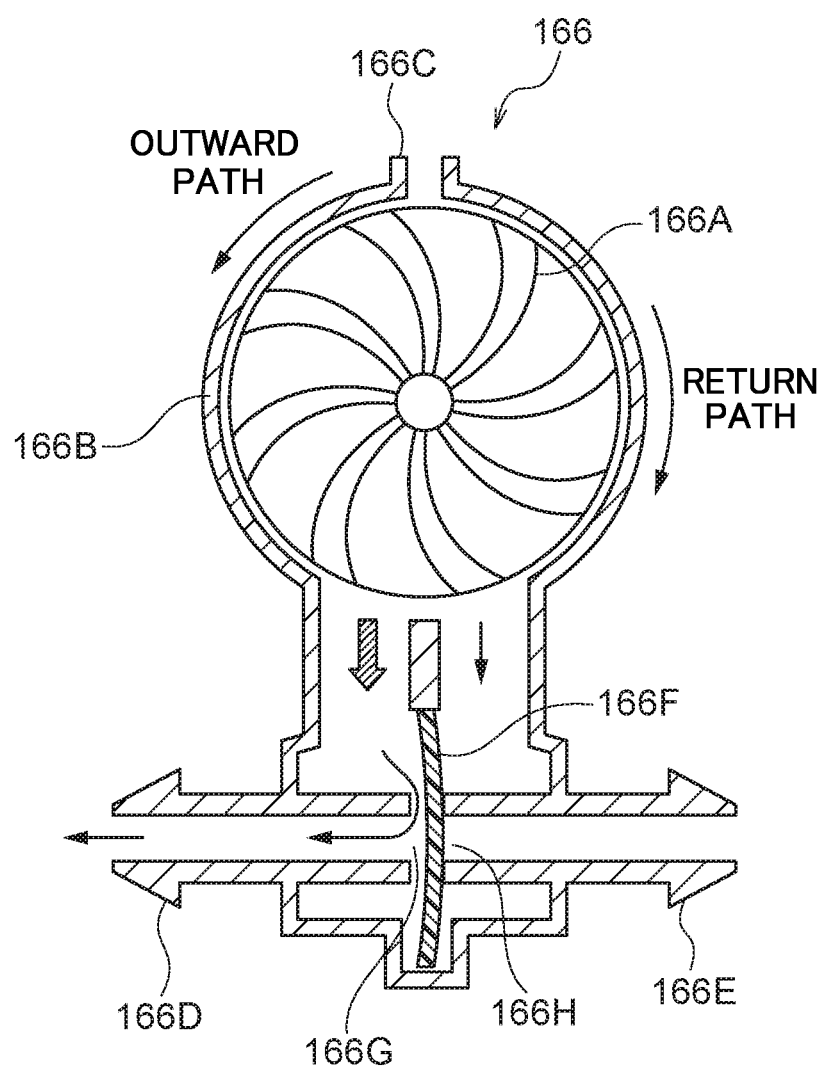

VEHICLE WIPER DEVICE AND VEHICLE WIPER DEVICE CONTROL METHOD

TECHNICAL FIELD

The present disclosure relates to a vehicle wiper device capable of changing a wiping range, and a control method of the vehicle wiper device.

BACKGROUND ART

In wiper devices that wipe the glass of a windshield or the like in an automobile, as illustrated in FIG. 19A, a wiper motor moves wiper arms 150D, 150P back and forth between lower return positions P4D, P4P and upper return positions P3D, P3P. Wiper blades 154D, 154P are coupled to leading end portions of the wiper arms 150D, 150P. The movement of the wiper arms 150D, 150P most often forms substantially circular arc shaped trajectories centered on pivot shafts 152D, 152P of the respective wiper arms 150P, 150D. Wiping ranges 156D, 156P, these being regions of a windshield glass 1 or the like that are wiped by the wiper blades 154D, 154P, accordingly have substantially fan shapes centered on the pivot shafts 152D, 152P.

It is necessary for wiper devices to prioritize wiping of the windshield glass 1 on the side of a driver's seat in order to secure the driver's field of view. Moreover, the windshield glass 1 of an automobile is substantially in the shape of an isosceles trapezoid. Therefore, in a parallel (tandem) wiper device in which the two wiper arms 150D, 150P swing at the same time and in the same direction as each other, in cases in which the pivot shafts 152D, 152P are provided below the windshield glass 1, the upper return position P3D of the wiper blade 154D on the driver's seat side is provided at a position alongside and close to a driver's seat side edge 1A of the isosceles trapezoid shaped windshield glass 1 (one upright side of the isosceles trapezoid shape).

In order to prioritize wiping of the driver's seat side of the windshield glass 1, in a tandem wiper device, the upper return position P3P of the wiper blade 154P on the front passenger seat side is also provided alongside the driver's seat side edge 1B of the windshield glass 1. However, as described above, since the wiping range of the wiper blade 154P is substantially fan shaped, providing the upper return position P3P at the position described above results in a non-wiped region 158 that is not wiped by the wiper blade 154P, centered on an upper corner 1C on the front passenger seat side of the windshield glass 1.

As illustrated in FIG. 19B, the implications of the non-wiped region 158 are particularly serious when turning left at a crossroad or the like, as it is possible that the driver's awareness of pedestrians may be impeded.

Japanese Patent Application Laid-Open (JP-A) No. 2000-25578 discloses a wiper device in which a front passenger seat side wiper blade is operated in a manner capable of wiping the non-wiped region 158.

SUMMARY OF INVENTION

Technical Problem

However, in the wiper device of JP-A No. 2000-25578, when in operation, the wiper blade does not adequately reach the top of the windshield glass on the front passenger seat side, and it is possible that the top of the windshield glass on the front passenger seat side may remain unwiped.

The present disclosure provides a vehicle wiper device and a vehicle wiper device control method in which a wiping range on a front passenger seat side of a windshield glass is changed when in a state in which a broad field of view should be secured on the front passenger seat side (a state in which the vehicle orientation shifts toward the front passenger seat side, or in other words when the driver shifts their gaze toward the front passenger seat side).

Solution to Problem

A first aspect of the present disclosure is a wiper device for a vehicle, the vehicle wiper device including a first motor, a second motor, a rotation angle detector, and a controller. The first motor includes a first output shaft, rotates the first output shaft to rotate a wiper arm back and forth about a pivot point of the wiper arm, and causes a wiper blade coupled to a leading end portion of the wiper arm to perform a back and forth wiping operation between an upper return position and a lower return position on a windshield. The second motor changes a wiping range on the windshield by the wiper blade. The rotation angle detector detects a rotation angle of the first output shaft. The controller controls the second motor according to a rotation angle of the first output shaft detected by the rotation angle detector in a state in which a broad field of view should be secured on a front passenger seat side.

In the first aspect described above, the second motor is controlled according to the rotation angle of the first output shaft detected by the rotation angle detector in a state in which a broad field of view should be secured on the front passenger seat side. This control changes the wiping range on the windshield by the wiper blade, thereby changing the wiping range on the front passenger seat side of the windshield. When not in a state in which a broad field of view should be secured on the front passenger seat side, the wiping range is not changed, thereby reducing distraction caused to occupants of the vehicle by the operation of the wiper device.

A second aspect of the present disclosure is the vehicle wiper device of the first aspect described above, further including a position locator for the vehicle, the vehicle position locator computing a current position of the vehicle based on a signal received from a satellite. In cases in which the current position computed by the vehicle position locator is within a predetermined distance of a center of a crossroad, the controller determines a state in which a broad field of view should be secured on the front passenger seat side to exist, and controls the second motor according to a rotation angle of the first output shaft.

The second aspect described above enables the wiping range to be changed by determining a state in which a broad field of view should be secured on the front passenger seat side to exist when the current position of the vehicle is within the predetermined distance of the center of the crossroad.

A third aspect of the present disclosure is the vehicle wiper device of the first aspect described above, further including a position locator for the vehicle, the vehicle position locator computing a current position of the vehicle based on a signal received from a satellite. The controller sets a route using a car navigation system that sets a route toward a predetermined point using map information and the current position computed by the vehicle position locator, and in cases in which the car navigation system issues an instruction to turn toward a front passenger seat side direction, the controller determines a state in which a broad field of view should be secured on the front passenger seat side to exist, and controls the second motor according to a rotation angle of the first output shaft.

The third aspect described above enables the wiping range to be changed in a manner coordinated with an instruction from the car navigation system to turn in a direction toward the front passenger seat side (an instruction to turn left in a right-hand drive vehicle, or an instruction to turn right in a left-hand drive vehicle).

A fourth aspect of the present disclosure is the vehicle wiper device of the first aspect described above, wherein in cases in which a signal input from a direction indicator switch of the vehicle indicates that the vehicle will turn toward the front passenger seat side, the controller determines a state in which a broad field of view should be secured on the front passenger seat side to exist, and controls the second motor according to a rotation angle of the first output shaft.

The fourth aspect described above enables the wiping range to be changed by determining a state in which a broad field of view should be secured on the front passenger seat side to exist when turning of the vehicle toward the front passenger seat side is detected based on operation of the direction indicator.

A fifth aspect of the present disclosure is the vehicle wiper device of the first aspect described above, wherein in cases in which a steering angle sensor of the vehicle detects a steering angle toward the front passenger seat side of the vehicle that is a threshold value or greater, the controller determines a state in which a broad field of view should be secured on the front passenger seat side to exist, and controls the second motor according to a rotation angle of the first output shaft.

The fifth aspect described above enables the wiping range to be changed by determining a state in which a broad field of view should be secured on the front passenger seat side to exist when turning of the vehicle toward the front passenger seat side is detected based on the vehicle steering angle detected by the steering angle sensor.

A sixth aspect of the present application is the vehicle wiper device of the first aspect described above, further including an imaging section that acquires an image looking ahead of the vehicle. The controller extracts a boundary of a road from an image acquired by the imaging section, and in cases in which the extracted boundary indicates a bend in the road or a curve of the road toward the front passenger seat side, the controller determines a state in which a broad field of view should be secured on the front passenger seat side to exist, and controls the second motor according to a rotation angle of the first output shaft.

The sixth aspect described above enables the wiping range to be changed by determining a state in which a broad field of view should be secured on the front passenger seat side to exist when the road ahead curves toward the front passenger seat side.

A seventh aspect of the present application is the vehicle wiper device of the first aspect to the sixth aspect described above, further including a speed detector of the vehicle to detect a speed of the vehicle. In a state in which a broad field of view should be secured on the front passenger seat side, the controller controls the second motor according to a rotation angle of the first output shaft in cases in which the vehicle speed detected by the vehicle speed detector is a threshold speed or greater.

The seventh aspect described above enables the wiping range to be changed when a state in which a broad field of view should be secured on the front passenger seat side has been determined to exist and in which the vehicle is traveling at a high speed.

An eighth aspect of the present disclosure is the vehicle wiper device of the first aspect to the sixth aspect described above, further including a cleaning liquid spray section that sprays cleaning liquid from a nozzle provided on the wiper arm. In a state in which a broad field of view should be secured on the front passenger seat side, the controller controls the second motor according to a rotation angle of the first output shaft and controls the cleaning liquid spray section so as to spray cleaning liquid from the nozzle.

The eighth aspect described above enables the windshield to be cleaned over a broad range by changing the wiping range and spraying the cleaning liquid from the nozzle provided on a leading end side of the wiper arm in cases in which a state in which a broad field of view should be secured on the front passenger seat side has been determined to exist.

A ninth aspect of the present disclosure is the vehicle wiper device of the first aspect described above, further including an imaging section and an optical detector. The imaging section acquires image data relating to the windshield. The optical detector emits infrared light toward the windshield and detects adhered material on a surface of the windshield based on a reflected amount of the infrared light or a transmitted amount of the infrared light. The imaging section and the optical detector are each provided on a vehicle cabin inside of the windshield at an upper portion of a front passenger seat side of the windshield. The controller determines a state in which a broad field of view should be secured on the front passenger seat side to exist based on the image data acquired by the imaging section and on a detection result of the optical detector, and controls the second motor according to a rotation angle of the first output shaft.

The ninth aspect described above enables the wiping range to be changed by determining a state in which a broad field of view should be secured on the front passenger seat side to exist based on image data relating to the windshield acquired by the imaging section, and on a detection result of the optical detector.

A tenth aspect of the present disclosure is a control method for a wiper device of a vehicle, the vehicle wiper device control method including starting back and forth rotation of a first output shaft of a first motor that includes the first output shaft, that rotates the first output shaft to rotate a wiper arm back and forth about a pivot point of the wiper arm, and that causes a wiper blade coupled to a leading end portion of the wiper arm to perform a back and forth wiping operation between an upper return position and a lower return position on a windshield. The vehicle wiper device control method also includes using a rotation angle detector to detect a rotation angle of the first output shaft, and, in a state in which a broad field of view should be secured on a front passenger seat side, starting rotation of a second output shaft of a second motor according to a rotation angle of the first output shaft detected by the rotation angle detector so as to rotate the second output shaft in a predetermined direction and change a wiping range on the windshield by the wiper blade.

In the tenth aspect described above, the second output shaft of the second motor is rotated according to the rotation angle of the first output shaft detected by the rotation angle detector in a state in which a broad field of view should be secured on the front passenger seat side. This rotation of the second output shaft changes the wiping range on the windshield by the wiper blade, thereby changing the wiping range on the front passenger seat side of the windshield. When not in a state in which a broad field of view should be secured on the front passenger seat side, the wiping range is not changed, thereby reducing distraction caused to occupants of the vehicle by the operation of the wiper device.

An eleventh aspect of the present disclosure is the vehicle wiper device control method of the tenth aspect described above, further including performing vehicle position location to compute a current position of the vehicle based on a signal received from a satellite. Starting the rotation of the second output shaft includes determining a state in which a broad field of view should be secured on the front passenger seat side to exist and changing the wiping range on the windshield by the wiper blade in cases in which the current position computed by performing the vehicle position location is within a predetermined distance of a center of a crossroad.

The eleventh aspect described above enables the wiping range to be changed by determining a state in which a broad field of view should be secured on the front passenger seat side to exist when the current position of the vehicle is within the predetermined distance of the center of the crossroad.

A twelfth aspect of the present application is the vehicle wiper device control method of the tenth aspect described above, further including performing vehicle position location to compute a current position of the vehicle based on a signal received from a satellite. Starting the rotation of the second output shaft includes setting a route using a car navigation system that sets a route toward a predetermined point toward a predetermined point using map information and the current position computed by performing the vehicle position location, and determining a state in which a broad field of view should be secured on the front passenger seat side to exist and changing the wiping range on the windshield by the wiper blade in cases in which the car navigation system issues an instruction to turn toward a front passenger seat side direction.

This vehicle wiper device control method enables the wiping range to be changed in a manner coordinated with an instruction from the car navigation system to turn in a direction toward the front passenger seat side (an instruction to turn left in a right-hand drive vehicle, or an instruction to turn right in a left-hand drive vehicle).

A thirteenth aspect of the present application is the vehicle wiper device control method of the tenth aspect described above, wherein starting the rotation of the second output shaft includes determining a state in which a broad field of view should be secured on the front passenger seat side to exist and changing the wiping range on the windshield by the wiper blade in cases in which a signal input from a direction indicator switch of the vehicle indicates that the vehicle will turn toward the front passenger seat side.

The thirteenth aspect described above enables the wiping range to be changed by determining a state in which a broad field of view should be secured on the front passenger seat side to exist when turning of the vehicle toward the front passenger seat side is detected based on operation of the direction indicator.

A fourteenth aspect of the present application is the vehicle wiper device control method of the tenth aspect described above, wherein starting the rotation of the second output shaft includes determining a state in which a broad field of view should be secured on the front passenger seat side to exist and changing the wiping range on the windshield by the wiper blade in cases in which a steering angle toward the front passenger seat side of the vehicle detected by a steering angle sensor of the vehicle is a threshold value or greater.

The fourteenth aspect described above enables the wiping range to be changed by determining a state in which a broad field of view should be secured on the front passenger seat side to exist when turning of the vehicle toward the front passenger seat side is detected based on the vehicle steering angle detected by the steering angle sensor.

A fifteenth aspect of the present application is the vehicle wiper device control method of the tenth aspect described above, wherein starting the rotation of the second output shaft includes extracting a boundary of a road from an image looking ahead of the vehicle, and determining a state in which a broad field of view should be secured on the front passenger seat side to exist and changing the wiping range on the windshield by the wiper blade in cases in which the extracted boundary indicates a bend in the road or a curve of the road toward the front passenger seat side.

The fifteenth aspect described above enables the wiping range to be changed by determining a state in which a broad field of view should be secured on the front passenger seat side to exist when the road ahead curves toward the front passenger seat side.

A sixteenth aspect of the present application is the vehicle wiper device control method of the tenth aspect to the fifteenth aspect described above, further including performing vehicle speed detection to detect a speed of the vehicle. Starting the rotation of the second output shaft includes changing the wiping range on the windshield by the wiper blade in cases in which a state in which a broad field of view should be secured on the front passenger seat side has been determined to exist and in which the vehicle speed detected by performing the vehicle speed detection is a threshold speed or greater.

The sixteenth aspect described above enables the wiping range to be changed when a state in which a broad field of view should be secured on the front passenger seat side has been determined to exist and in which the vehicle is traveling at a high speed.

A seventeenth aspect of the present application is the vehicle wiper device control method of the tenth aspect to the fifteenth aspect described above, further including performing cleaning liquid spraying to spray cleaning liquid from a nozzle provided on the wiper arm. Starting the rotation of the second output shaft includes changing the wiping range on the windshield by the wiper blade and executing the cleaning liquid spraying in cases in which a state in which a broad field of view should be secured on the front passenger seat side has been determined to exist.

The seventeenth aspect described above enables the windshield to be cleaned over a broad range by changing the wiping range and spraying the cleaning liquid from the nozzle provided on a leading end side of the wiper arm in cases in which a state in which a broad field of view should be secured on the front passenger seat side has been determined to exist.

An eighteenth aspect of the present application is the vehicle wiper device control method of the tenth aspect described above, wherein starting rotation of the second output shaft includes determining a state in which a broad field of view should be secured on the front passenger seat side to exist based on image data relating to the windshield acquired by an imaging section that is provided on a vehicle cabin inside of the windshield at an upper portion of a front passenger seat side of the windshield, and based on a detection result of an optical detector that is provided on the vehicle cabin inside of the windshield at an upper portion of a front passenger seat side of the windshield and that emits infrared light toward the windshield and detects adhered material on a surface of the windshield based on a reflected amount of the infrared light or a transmitted amount of the infrared light, and changing the wiping range on the windshield by the wiper blade.

The eighteenth aspect described above enables the wiping range to be changed by determining a state in which a broad field of view should be secured on the front passenger seat side to exist based on image data relating to the windshield acquired by the imaging section, and on a detection result of the optical detector.

BRIEF DESCRIPTION OF DRAWINGS

FIG. 15 is a flowchart illustrating an example of left-turn wiping processing to detect a left-hand curve ahead of a vehicle and change a wiping range on a front passenger seat side of a windshield glass in a wiper system according to the second exemplary embodiment of the present disclosure.

FIG. 17 is a cross-section illustrating an example of a washer pump according to the third exemplary embodiment of the present disclosure.

DESCRIPTION OF EMBODIMENTS

First Exemplary Embodiment

Figure 1:
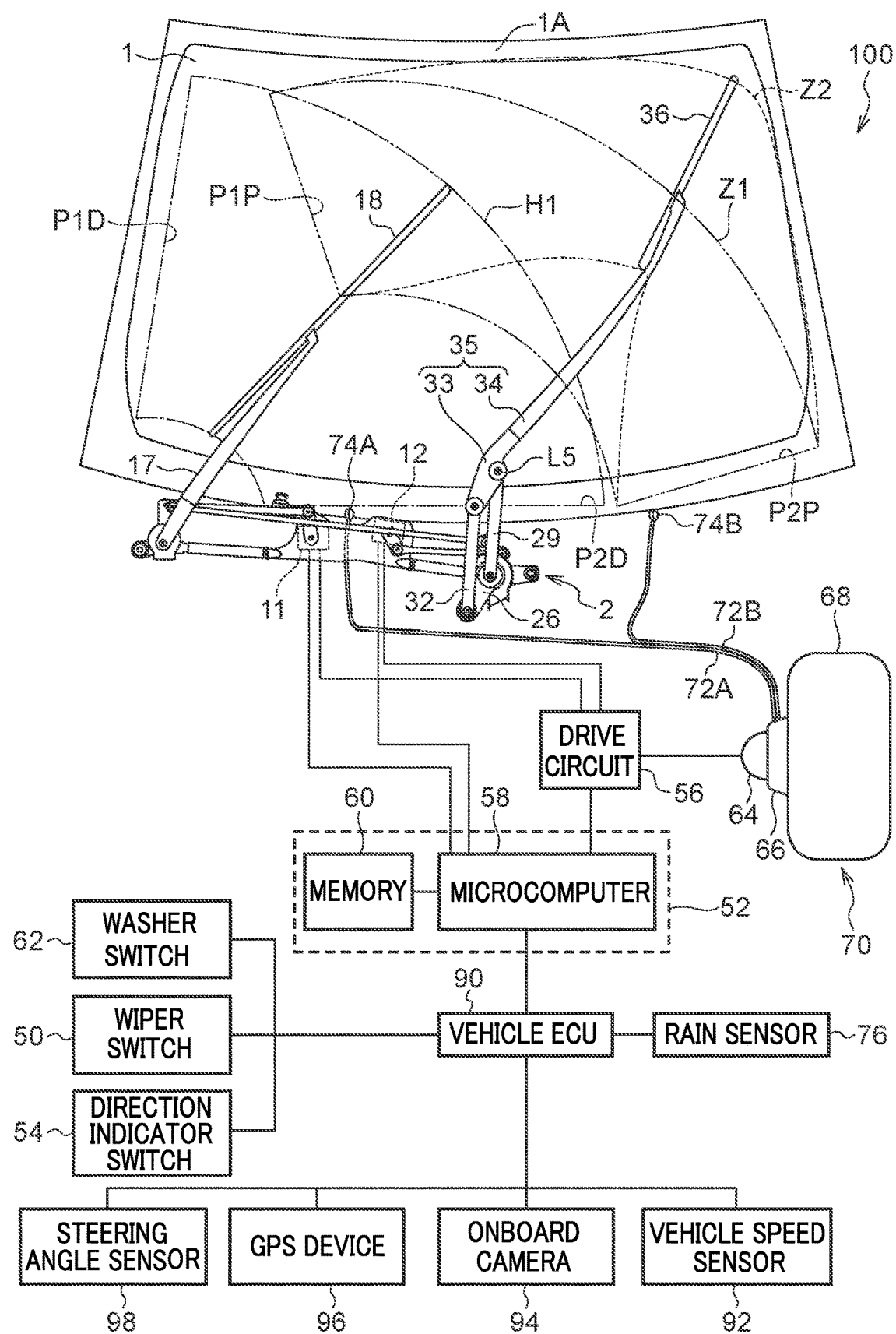
FIG. 1 is a schematic view illustrating an example of a vehicle wiper system including a vehicle wiper device according to a first exemplary embodiment of the present disclosure.

FIG. 1 is a schematic view illustrating an example of a wiper system 100 including a vehicle wiper device (referred to hereafter as "wiper device") 2 according to a first exemplary embodiment of the present disclosure. The wiper system 100 illustrated in FIG. 1 is used to wipe a windshield glass 1, serving as a "windshield", provided to a vehicle such as a passenger car. The wiper system 100 is configured including a pair of wiper arms (a driver's seat side wiper arm 17 and a front passenger seat side wiper arm 35, described later), a first motor 11, a second motor 12, a control circuit 52, a drive circuit 56, and a washer device 70.

FIG. 1 illustrates an example of a right-hand drive vehicle, in which the right side of the vehicle (the left side in FIG. 1) is a driver's seat side, and the left side of the vehicle (the right side in FIG. 1) is a front passenger seat side. In the case of a left-hand drive vehicle, the left side of the vehicle (the right side in FIG. 1) would be the driver's seat side, and the right side of the vehicle (the left side in FIG. 1) would be the front passenger seat side. In the case of a left-hand drive vehicle, the configuration of the wiper device 2 would be reversed in the left-right direction.

The first motor 11 is a drive source that rotates an output shaft forward and backward over a predetermined rotation angle range in order to move the driver's seat side wiper arm 17 and the front passenger seat side wiper arm 35 back and forth over the windshield glass 1. In the present exemplary embodiment, when the first motor 11 rotates forward, a driver's seat side wiper blade 18 of the driver's seat side wiper arm 17 moves so as to wipe from a lower return position P2D to an upper return position P1D, and a front passenger seat side wiper blade 36 of the front passenger seat side wiper arm 35 moves so as to wipe from a lower return position P2P to an upper return position P1P. Moreover, when the first motor 11 rotates backward, the driver's seat side wiper blade 18 of the driver's seat side wiper arm 17 moves so as to wipe from the upper return position P1D to the lower return position P2D, and the front passenger seat side wiper blade 36 of the front passenger seat side wiper arm 35 moves so as to wipe from the upper return position P1P to the lower return position P2P.

An outer edge portion of the windshield glass 1 is configured by a light-blocking portion 1A that is coated with a black ceramic pigment to block visible light and ultraviolet light. The black pigment is coated onto the outer edge portion at a vehicle cabin inside of the windshield glass 1, and is then heat treated at a predetermined temperature such that the pigment melts and fixes to the vehicle cabin inside surface of the windshield glass 1. The windshield glass 1 is fixed to a body of the vehicle using an adhesive applied to the outer edge portion. As illustrated in FIG. 1, providing the outer edge portion with the light-blocking portion 1A that does not allow ultraviolet light to pass through, thereby suppressing ultraviolet deterioration of the adhesive.

When the second motor 12, described later, is not operating, the output shaft of the first motor 11 (a first output shaft 11A, described later) is rotated forward and rotated backward over a rotation angle between 0° and a predetermined rotation angle (referred to hereafter as a "first predetermined rotation angle"), such that the driver's seat side wiper blade 18 wipes a wiping range H1, and the front passenger seat side wiper blade 36 wipes a wiping range Z1.

The second motor 12 is a drive source that rotates an output shaft (a second output shaft 12A, described later) of the second motor 12 forward and backward over a rotation angle between 0° and a predetermined rotation angle (referred to hereafter as a "second predetermined rotation angle"), in order to give the appearance of extending the front passenger seat side wiper arm 35. Operating the second motor 12 while the first motor 11 is in operation gives the appearance of extending the front passenger seat side wiper arm 35 upward on the front passenger seat side, such that the front passenger seat side wiper blade 36 wipes a wiping range Z2. Moreover, changing the size of the second predetermined rotation angle enables the range of the extension of the front passenger seat side wiper arm 35 to be adjusted. For example, setting a large second predetermined rotation angle increases the range of the extension of the front passenger seat side wiper arm 35, and setting a small second predetermined rotation angle decreases the range of the extension of the front passenger seat side wiper arm 35.

The first motor 11 and the second motor 12 are capable of controlling the rotation directions of their respective output shafts so as to rotate forward or rotate backward. The first motor 11 and the second motor 12 are also capable of controlling the rotation speeds of their respective output shafts. The first motor 11 and the second motor 12 are, for example, either brushed DC motors or brushless DC motors.

The control circuit 52 is connected to the first motor 11 and the second motor 12 so as to control the rotation of the first motor 11 and the second motor 12. For example, the control circuit 52 according to the present exemplary embodiment computes duty ratios of voltages to be applied to the first motor 11 and the second motor 12 based on the rotation directions, rotation positions, rotation speeds, and rotation angles of the output shafts of the first motor 11 and the second motor 12, detected by absolute angle sensors (discussed below as a first absolute angle sensor 114 and a second absolute angle sensor 118), serving as "rotation angle detectors", provided in the vicinity of terminal ends of the output shafts of the first motor 11 and the second motor 12.

In the present exemplary embodiment, the voltages applied to the first motor 11 and the second motor 12 are generated by pulse width modulation (PWM) that modulates a pulse waveform by using a switch device to switch a voltage (approximately 12V) of an onboard battery, serving as a power source, ON and OFF. The duty ratio of the present exemplary embodiment is the duration of a single pulse generated when the switch device is ON proportionate to the duration of a single period of the waveform of the PWM-generated voltage. Moreover, a single period of the waveform of the voltage generated by the PWM is the sum of the duration of the single pulse and the duration in which the switch device is OFF and no pulse is generated. The drive circuit 56 generates voltages to be applied to the first motor 11 and the second motor 12 by switching a switch device ON and OFF in the drive circuit 56 according to the duty ratios computed by the control circuit 52. The drive circuit 56 applies the generated voltages to coil terminals of the first motor 11 and the second motor 12.

The first motor 11 and the second motor 12 according to the present exemplary embodiment each include a speed reduction mechanism configured by a worm gear. Accordingly, the rotation directions, rotation speeds, and rotation angles of the respective output shafts are not the same as the rotation speeds and rotation angles in a body of the first motor 11 and a body of the second motor 12. However, since the speed reduction mechanism of each motor is integral and non-removable in the present exemplary embodiment, hereafter, the rotation speeds and rotation angles of the output shafts of the first motor 11 and the second motor 12 will be considered to be the rotation directions, rotation speeds, and rotation angles of the first motor 11 and the second motor 12 respectively.

The absolute angle sensors are, for example, provided within the speed reduction mechanisms of the first motor 11 and the second motor 12, and are sensors that convert the magnetic fields (magnetic force) of an excitation coil or magnet rotating together with the respective output shaft into current and detect this current. For example, the absolute angle sensors are magnetic sensors such as MR sensors.

The control circuit 52 includes a microcomputer 58 that is capable of computing the position of the driver's seat side wiper blade 18 on the windshield glass 1 based on the rotation angle of the output shaft of the first motor 11, as detected by the absolute angle sensor provided in the vicinity of the terminal end of the output shaft of the first motor. The microcomputer 58 controls the drive circuit 56 so as to change the rotation speed of the output shaft of the first motor 11 according to the computed position.

The microcomputer 58 also computes the position of the front passenger seat side wiper blade 36 on the windshield glass 1 based on the rotation angle of the output shaft of the first motor 11, as detected by the absolute angle sensor provided in the vicinity of the terminal end of the output shaft of the first motor, and controls the drive circuit 56 so as to change the rotation speed of the output shaft of the second motor 12 according to the computed position. The microcomputer 58 also computes a level of extension of the front passenger seat side wiper arm 35 based on the rotation angle of the output shaft of the second motor 12 as detected by the absolute angle sensor provided in the vicinity of the terminal end of the output shaft of the second motor 12.

The control circuit 52 is provided with memory 60, this being a storage device stored with data and a program employed in controlling the drive circuit 56. The memory 60 is stored with data and a program used to compute rotation speeds and the like (including the rotation angles) of the output shafts of the first motor 11 and the second motor 12 according to the rotation angle of the output shaft of the first motor 11, this representing the positions of the driver's seat side wiper blade 18 and the front passenger seat side wiper blade 36 on the windshield glass 1.

A vehicle Electronic Control Unit (ECU) 90 that performs overall control of a vehicle engine and the like is connected to the microcomputer 58. Also connected to the vehicle ECU 90 are a wiper switch 50, a direction indicator switch 54, a washer switch 62, a rain sensor 76, a vehicle speed sensor 92 that detects the speed of the vehicle, an onboard camera 94 that captures images ahead of the vehicle, a Global Positioning System (GPS) device 96, and a steering angle sensor 98.

The wiper switch 50 is a switch that switches power supply from the vehicle battery to the first motor 11 ON and OFF. The wiper switch 50 is capable of switching between a low speed actuation mode selection position for actuating the driver's seat side wiper blade 18 and the front passenger seat side wiper blade 36 at low speed, a high speed actuation mode selection position for actuating the driver's seat side wiper blade 18 and the front passenger seat side wiper blade 36 at high speed, an intermittent actuation mode selection position for actuating the driver's seat side wiper blade 18 and the front passenger seat side wiper blade 36 intermittently at a fixed period, an AUTO actuation mode selection position for actuating the driver's seat side wiper blade 18 and the front passenger seat side wiper blade 36 when raindrops have been detected by the rain sensor 76, and a stowed (inactive) mode selection position. Signals corresponding to the selection positions for each mode are output to the microcomputer 58 via the vehicle ECU 90.

When a signal corresponding to the selection position of the respective mode is output from the wiper switch 50 and input to the microcomputer 58 via the vehicle ECU 90, the microcomputer 58 uses the data and program stored in the memory 60 to perform control corresponding to the signal output from the wiper switch 50.

In the present exemplary embodiment, the wiper switch 50 may be provided with a separate mode changer switch that is used to change the wiping range of the front passenger seat side wiper blade 36 to the wiping range Z2. When the mode changer switch is ON, a predetermined signal is input to the microcomputer 58 via the vehicle ECU 90. When the predetermined signal is input to the microcomputer 58, if, for example, the front passenger seat side wiper blade 36 is moving from the lower return position P2P toward the upper return position P1P, the microcomputer 58 controls the second motor 12 so as to wipe over the wiping range Z2.

The direction indicator switch 54 is a switch used to instruct actuation of a direction indicator (not illustrated in the drawings) of the vehicle. The direction indicator switch 54 is operated by the driver to output a signal to switch ON a left or right direction indicator to the vehicle ECU 90. Based on the signal output from the direction indicator switch 54, the vehicle ECU 90 causes a left or right direction indicator lamp to flash. The signal output from the direction indicator switch 54 is also input to the microcomputer 58 via the vehicle ECU 90.

The washer switch 62 is a switch used to switch ON or OFF power supply from the vehicle battery to a washer motor 64, the first motor 11, and the second motor 12. For example, the washer switch 62 is integrally provided to an operation unit such as a lever provided to the wiper switch 50 described above, and is switched ON by a manual operation to pull the lever toward an occupant. When the washer switch 62 is switched ON, the microcomputer 58 actuates the washer motor 64 and the first motor 11. The microcomputer 58 also controls the second motor 12 such that the front passenger seat side wiper blade 36 wipes over the wiping range Z2 when the front passenger seat side wiper blade 36 is moving so as to wipe from the lower return position P2P to the upper return position P1P, and controls the second motor 12 such that the front passenger seat side wiper blade 36 wipes over the wiping range Z1 when the front passenger seat side wiper blade 36 is moving so as to wipe from the upper return position P1P to the lower return position P2P. This control enables the front passenger seat side of the windshield glass 1 to be wiped over a wide area.

While the washer switch 62 is ON, rotation of the washer motor 64 provided to the washer device 70 drives a washer pump 66. The washer pump 66 conveys washer liquid under pressure from a washer liquid tank 68 to either a driver's seat side hose 72A or a front passenger seat side hose 72B. The driver's seat side hose 72A is connected to a driver's seat side nozzle 74A provided beneath the windshield glass 1 on the driver's seat side. The front passenger seat side hose 72B is connected to a front passenger seat side nozzle 74B provided beneath the windshield glass 1 on the front passenger seat side. The washer liquid that has been conveyed under pressure is sprayed onto the windshield glass 1 from the driver's seat side nozzle 74A and the front passenger seat side nozzle 74B. Washer liquid that has landed on the windshield glass 1 is wiped away, together with dirt on the windshield glass 1, by the movement of the driver's seat side wiper blade 18 and the front passenger seat side wiper blade 36.

The microcomputer 58 performs control such that the washer motor 64 is only actuated while the washer switch 62 is ON. The microcomputer 58 also controls the first motor 11 such that even when the washer switch 62 has been switched OFF, the driver's seat side wiper blade 18 and the front passenger seat side wiper blade 36 continue moving until they reach the lower return positions P2D, P2P. The microcomputer 58 also controls the second motor 12 such that if the washer switch 62 is switched OFF while the driver's seat side wiper blade 18 and the front passenger seat side wiper blade 36 are wiping toward the upper return positions P1D, P1P, the wiping range Z2 is wiped until the driver's seat side wiper blade 18 and the front passenger seat side wiper blade 36 rotated by the first motor 11 reach the upper return positions P1D, P1P.

The rain sensor 76 is, for example, a type of optical sensor provided at the vehicle cabin inside of the windshield glass 1, and detects water droplets on the surface of the windshield glass 1. For example, the rain sensor 76 includes an LED, this being an infrared light-emitting optical device, a photodiode, this being a light receiving element, a lens that forms an infrared light path, and a control circuit. Infrared light radiated from the LED is totally reflected by the windshield glass 1. However, if water droplets are present on the surface of the windshield glass 1, part of the infrared light passes through the water droplets and is released to the outside, reducing the amount of reflection by the windshield glass 1. The amount of light that enters the photodiode, this being the light receiving element, therefore decreases. This reduction in the amount of light is used to detect water droplets on the surface of the windshield glass 1.

The vehicle speed sensor 92 is a sensor that detects a revolution speed of a wheel of the vehicle, and outputs a signal indicating this revolution speed. The vehicle ECU 90 computes the vehicle speed based on the signal output by the vehicle speed sensor 92 and the circumference of the wheel.

The onboard camera 94 is a device that acquires video data by capturing images ahead of the vehicle. The vehicle ECU 90 is capable of performing image processing on the video data acquired by the onboard camera 94 in order to determine, for example, if the vehicle is coming into a curve in the road. The vehicle ECU 90 is also capable of computing the brightness ahead of the vehicle based on the luminance of the video data acquired by the onboard camera 94.

Figure 20:
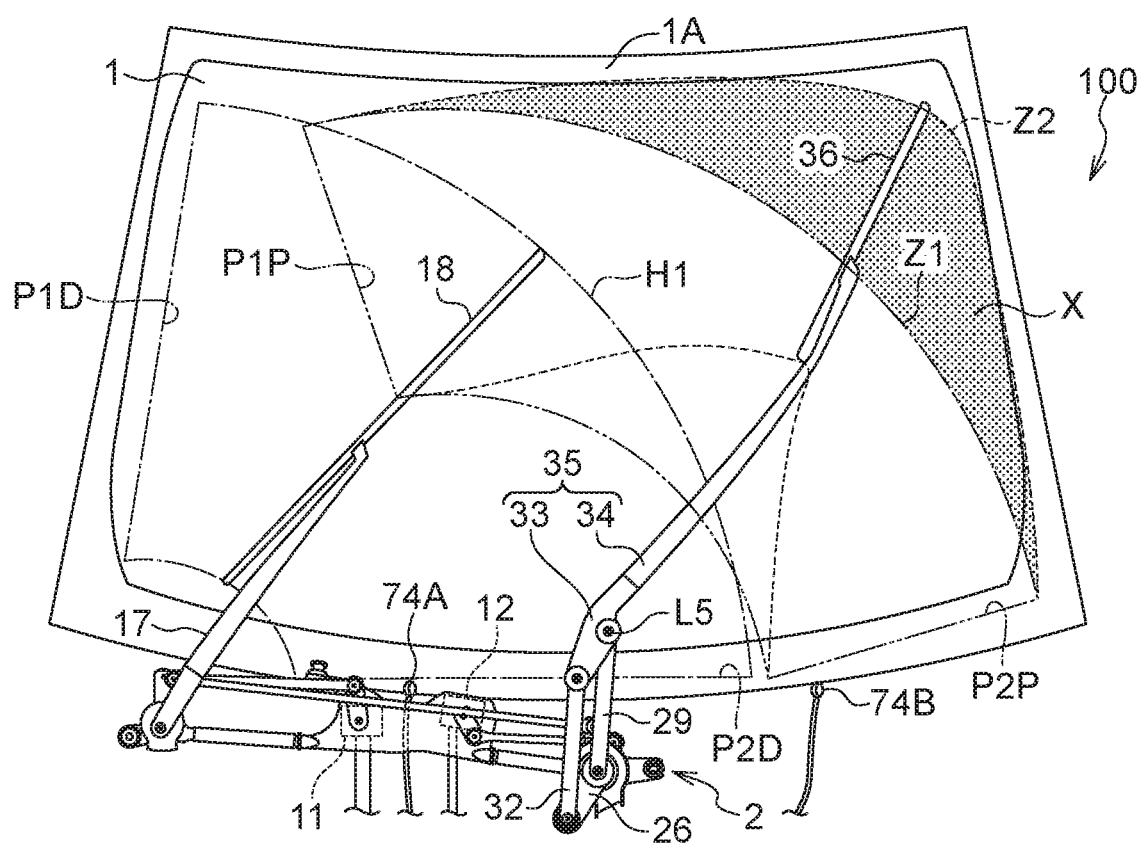
FIG. 20 is an explanatory diagram illustrating a non-wiped region arising when a wiping range is not changed.

Note that the rain sensor 76 and the onboard camera 94 are, for example, provided at positions corresponding to the top center of the windshield glass 1 and on the vehicle cabin inside of the windshield glass 1. More specifically, such components are often provided on the reverse of a room mirror or the like (not illustrated in the drawings). However, in the present exemplary embodiment, the positions of the rain sensor 76 and the onboard camera 94 are not limited to the top center of the windshield glass 1 and on the vehicle cabin inside of the windshield glass 1, and the rain sensor 76 and the onboard camera 94 may be provided on the vehicle cabin inside of the windshield glass 1 at the top of the windshield glass 1 on the front passenger seat side. Providing the rain sensor 76 and the onboard camera 94 on the vehicle cabin inside of the windshield glass 1 at the top of the windshield glass 1 on the front passenger seat side enables a configuration in which information (images, or the presence or absence of water droplets) regarding at least a portion of a non-wiped region X, illustrated in FIG. 20, can be acquired. Note that although the non-wiped region X in FIG. 20 is within the wiping range Z2 of the front passenger seat side wiper arm 35 when extended, it is a region that is outside of the wiping range Z1 of the front passenger seat side wiper arm 35 when the front passenger seat side wiper arm 35 is not extended.

The microcomputer 58 may control the second motor 12 such that the wiping range Z2 is wiped when the rain sensor 76 has detected water droplets on the surface of the windshield glass 1, for example, in the non-wiped region X.

Moreover, the microcomputer 58 may control the second motor 12 such that the wiping range Z2 is wiped based on image feature values in image data acquired by the onboard camera 94. For example, the microcomputer 58 may control the second motor 12 such that the wiping range Z2 is wiped when the difference between an image feature value from the wiping range Z1 of the windshield glass 1 and an image feature value from the non-wiped region X in image data acquired by the onboard camera 94 reaches a predetermined value or greater.

The image feature values are, for example, luminance values. The microcomputer 58 may determine that adhered matter is present in the non-wiped region X and control the second motor 12 such that the wiping range Z2 is wiped when the difference between a luminance value from the wiping range Z1 and a luminance value from the non-wiped region X reaches a predetermined value or greater.

The image feature values are an optical flow representing movement vectors at a leading end portion of the front passenger seat side wiper blade 36. The microcomputer 58 considers snow to be present on the windshield glass 1 and controls the second motor 12 such that the wiping range Z2 is wiped when a change amount in the movement vector of the front passenger seat side wiper blade 36 represented by this optical flow becomes a predetermined value or lower.

The GPS device is a device that computes a current position of the vehicle based on location signals received from a GPS satellite up above. In the present exemplary embodiment, the wiper system 100 employs a dedicated GPS device 96. However, other GPS devices may be employed in cases in which the vehicle is provided with other GPS devices such as a car navigation system.

The steering angle sensor 98 is, for example, provided to a steering wheel rotation shaft (not illustrated in the drawings), and is a sensor that detects a rotation angle of the steering wheel.

Explanation follows regarding configuration of the wiper device 2 according to the present exemplary embodiment, with reference to FIG. 2 to FIG. 8. As illustrated in FIG. 2 and FIG. 4 to FIG. 8, the wiper device 2 according to the present exemplary embodiment includes a frame-shaped central frame 3, and a pair of pipe frames 4, 5 that are each fixed to the central frame 3 at one end portion, and extend from the central frame 3 toward one or the other vehicle width direction side. Another end portion of the pipe frame 4 is formed with a first holder member 6 that includes a driver's seat side pivot shaft 15 and so on of the driver's seat side wiper arm 17. Another end portion of the pipe frame 5 is formed with a second holder member 7 that includes a second front passenger seat side pivot shaft 22 and so on of the front passenger seat side wiper arm 35. The wiper device 2 is supported on the vehicle at a support portion 3A provided to the central frame 3, and is fixed to the vehicle by fastening to the vehicle using bolts or the like at a fixing portion 6A of the first holder member 6 and at a fixing portion 7A of the second holder member 7.

The first motor 11 and the second motor 12 that drive the wiper device 2 are provided to the wiper device 2 at a back face of the central frame 3 (at a face that faces into the vehicle cabin). The first output shaft 11A of the first motor 11 passes through the central frame 3 and projects from a front face of the central frame 3 (a face that faces toward the outside of the vehicle). One end of a first drive crank arm 13 is fixed to a leading end portion of the first output shaft 11A. The second output shaft 12A of the second motor 12 passes through the central frame 3 and projects from the front face of the central frame 3. One end of a second drive crank arm 14 is fixed to a leading end portion of the second output shaft 12A.

The driver's seat side pivot shaft 15 is rotatably supported by the first holder member 6. One end of a driver's seat side swing lever 16 is fixed to a base end portion of the driver's seat side pivot shaft 15 (on the far side in FIG. 2), and an arm head of the driver's seat side wiper arm 17 is fixed to a leading end portion of the driver's seat side pivot shaft 15 (on the near side in FIG. 2). As illustrated in FIG. 1, the driver's seat side wiper blade 18 for wiping the driver's seat side of the windshield glass 1 is coupled to a leading end portion of the driver's seat side wiper arm 17.

The other end of the first drive crank arm 13 and the other end of the driver's seat side swing lever 16 are coupled together through a first coupling rod 19. When the first motor 11 is driven, the first drive crank arm 13 rotates, and this rotation force is transmitted through the first coupling rod 19 to the driver's seat side swing lever 16, causing the driver's seat side swing lever 16 to swing. Swinging the driver's seat side swing lever 16 also swings the driver's seat side wiper arm 17, such that the driver's seat side wiper blade 18 wipes the wiping range H1 between the lower return position P2D and the upper return position P1D.

Figure 2:
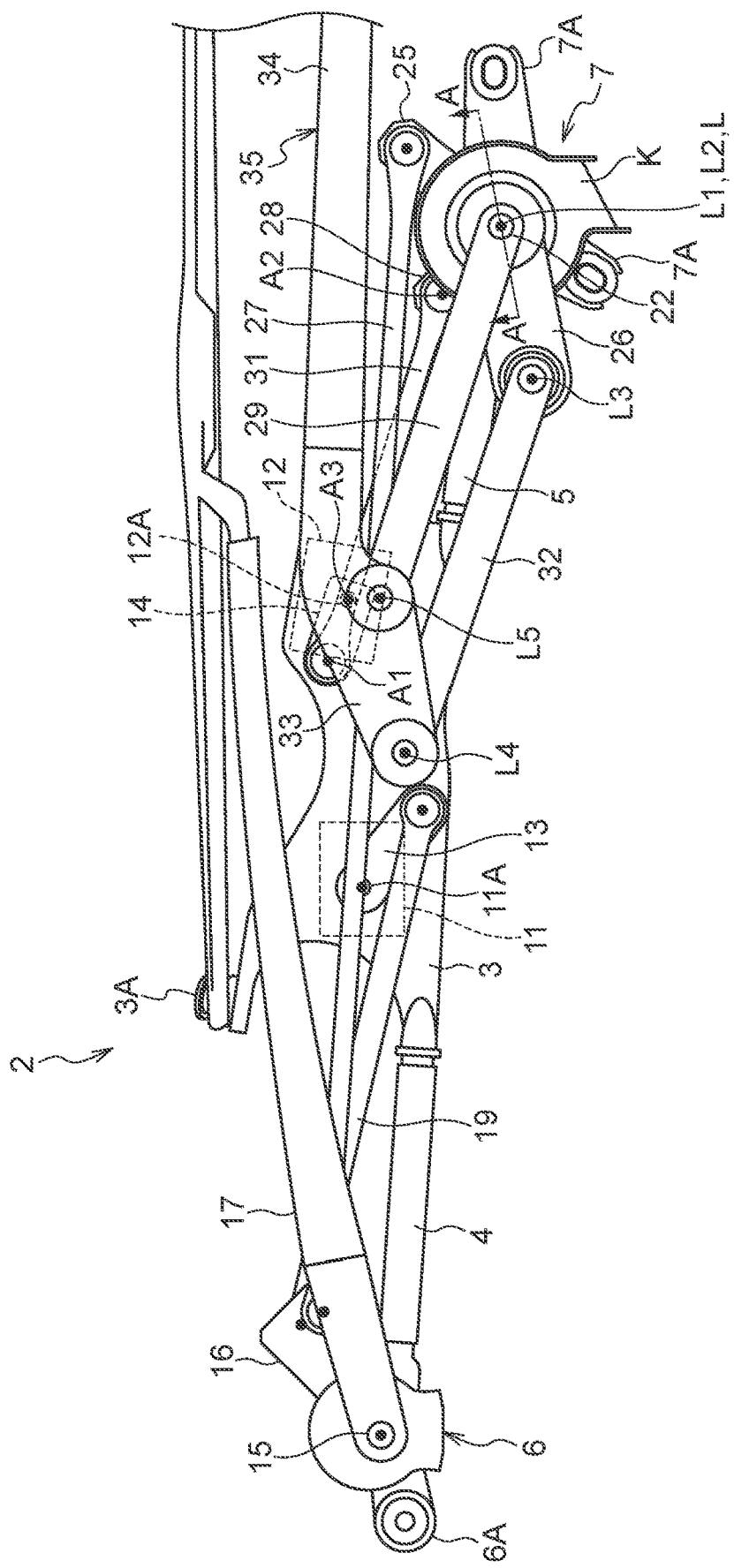
FIG. 2 is a plan view illustrating an inactive state of a vehicle wiper device according to the first exemplary embodiment of the present disclosure.
Figure 3:
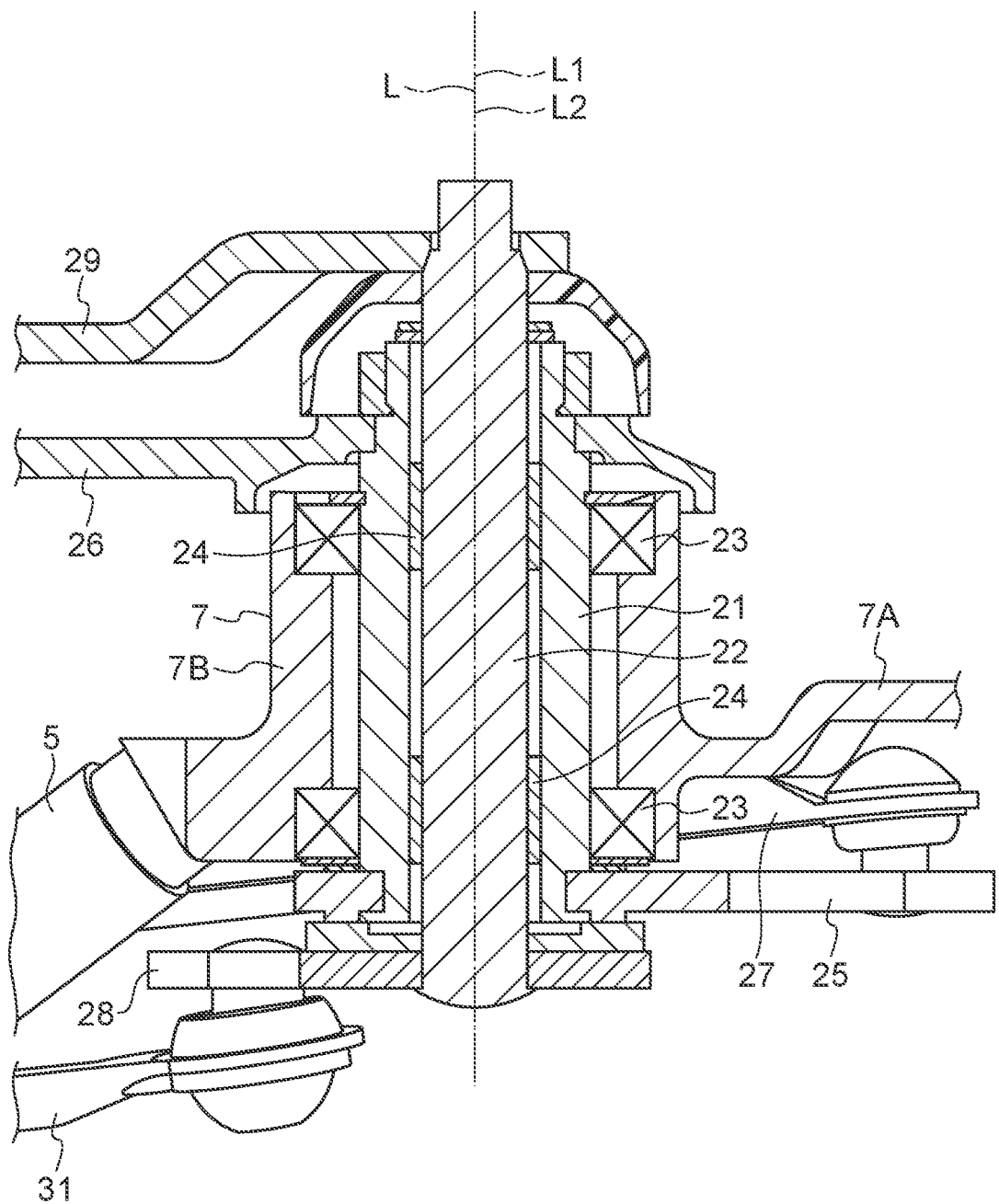
FIG. 3 is a cross-section of a second holder member, taken along line A-A in FIG. 2.

FIG. 3 is a cross-section illustrating the second holder member 7 as sectioned along line A-A in FIG. 2. As illustrated in FIG. 3, the second holder member 7 supports a first front passenger seat side pivot shaft 21 so as to be capable of rotating about a first axis L1, and supports a second front passenger seat side pivot shaft 22 so as to be capable of rotating about a second axis L2. In the present exemplary embodiment, the first axis L1 and the second axis L2 are disposed on (centered on) the same straight line L.

Note that FIG. 3 illustrates a state in which a waterproof cover K illustrated in FIG. 2 and FIG. 4 to FIG. 8 has been removed.

The second holder member 7 is formed with a tubular portion 7B, and the first front passenger seat side pivot shaft 21 is rotatably supported through a shaft bearing 23 at the peripheral inside of the tubular portion 7B. The first front passenger seat side pivot shaft 21 is formed in a tube shape, and the second front passenger seat side pivot shaft 22 is rotatably supported through a shaft bearing 24 at the peripheral inside of the first front passenger seat side pivot shaft 21.

One end of a first front passenger seat side swing lever 25 is fixed to a base end portion of the first front passenger seat side pivot shaft 21, and one end of a first drive lever 26 is fixed to a leading end portion of the first front passenger seat side pivot shaft 21. As illustrated in FIG. 2, the other end of the first front passenger seat side swing lever 25 and the other end of the driver's seat side swing lever 16 are coupled together by a second coupling rod 27. Accordingly, when the first motor 11 is driven and the driver's seat side swing lever 16 swings, the second coupling rod 27 transmits drive force to the first front passenger seat side swing lever 25, and the first drive lever 26 swings (rotates) about the first axis L1 together with the first front passenger seat side swing lever 25.

As illustrated in FIG. 3, the second front passenger seat side pivot shaft 22 is formed longer than the first front passenger seat side pivot shaft 21, and a base end portion and a leading end portion of the second front passenger seat side pivot shaft 22 project out from the first front passenger seat side pivot shaft 21 in an axial direction. One end of a second front passenger seat side swing lever 28 is fixed to a base end portion of the second front passenger seat side pivot shaft 22, and one end of a second drive lever 29 is fixed to a leading end portion of the second front passenger seat side pivot shaft 22.

The other end of the second drive crank arm 14 and the other end of the second front passenger seat side swing lever 28 are coupled together by a third coupling rod 31. Accordingly, when the second motor 12 is driven, the second drive crank arm 14 rotates, and the third coupling rod 31 transmits drive force of the second drive crank arm 14 to the second front passenger seat side swing lever 28, such that the second drive lever 29 swings (rotates) together with the second front passenger seat side swing lever 28. As described above, the first front passenger seat side pivot shaft 21 and the second front passenger seat side pivot shaft 22 are provided coaxially to one another. However, movement of the first front passenger seat side pivot shaft 21 and the second front passenger seat side pivot shaft 22 is not coupled, and therefore the first front passenger seat side pivot shaft 21 and the second front passenger seat side pivot shaft 22 rotate independently of each other.

As illustrated in FIG. 2 and FIG. 4 to FIG. 8, the wiper device 2 includes a first following lever 32. A base end portion of the first following lever 32 is coupled to the other end side of the first drive lever 26 so as to be capable of rotating about a third axis L3.

The wiper device 2 also includes an arm head 33 configuring a second following lever. A base end portion of the arm head 33 is coupled a leading end side of the first following lever 32 so as to be capable of rotating about a fourth axis L4. A leading end side of the arm head 33 is coupled to the other end side of the second drive lever 29 so as to be capable of rotating about a fifth axis L5. The arm head 33 configures the front passenger seat side wiper arm 35 together with a retainer 34. A base end portion of the retainer 34 is fixed to the leading end of the arm head 33. The front passenger seat side wiper blade 36 that wipes the front passenger seat side of the windshield glass 1 is coupled to a leading end portion of the front passenger seat side wiper arm 35.

The first drive lever 26, the second drive lever 29, the first following lever 32, and the arm head 33 are coupled such that a length from the first axis L1 (second axis L2) to the third axis L3 is the same as the length from the fourth axis L4 to the fifth axis L5. The first drive lever 26, the second drive lever 29, the first following lever 32, and the arm head 33 are also coupled such that the length from the third axis L3 to the fourth axis L4 is the same as the length from the first axis L1 (second axis L2) to the fifth axis L5. Accordingly, the first drive lever 26 and the arm head 33 are retained parallel to each other, and the second drive lever 29 and the first following lever 32 are retained parallel to each other. The first drive lever 26, the second drive lever 29, the first following lever 32, and the arm head 33 configure a link mechanism that has a substantially parallelogram shape.

Figure 4:
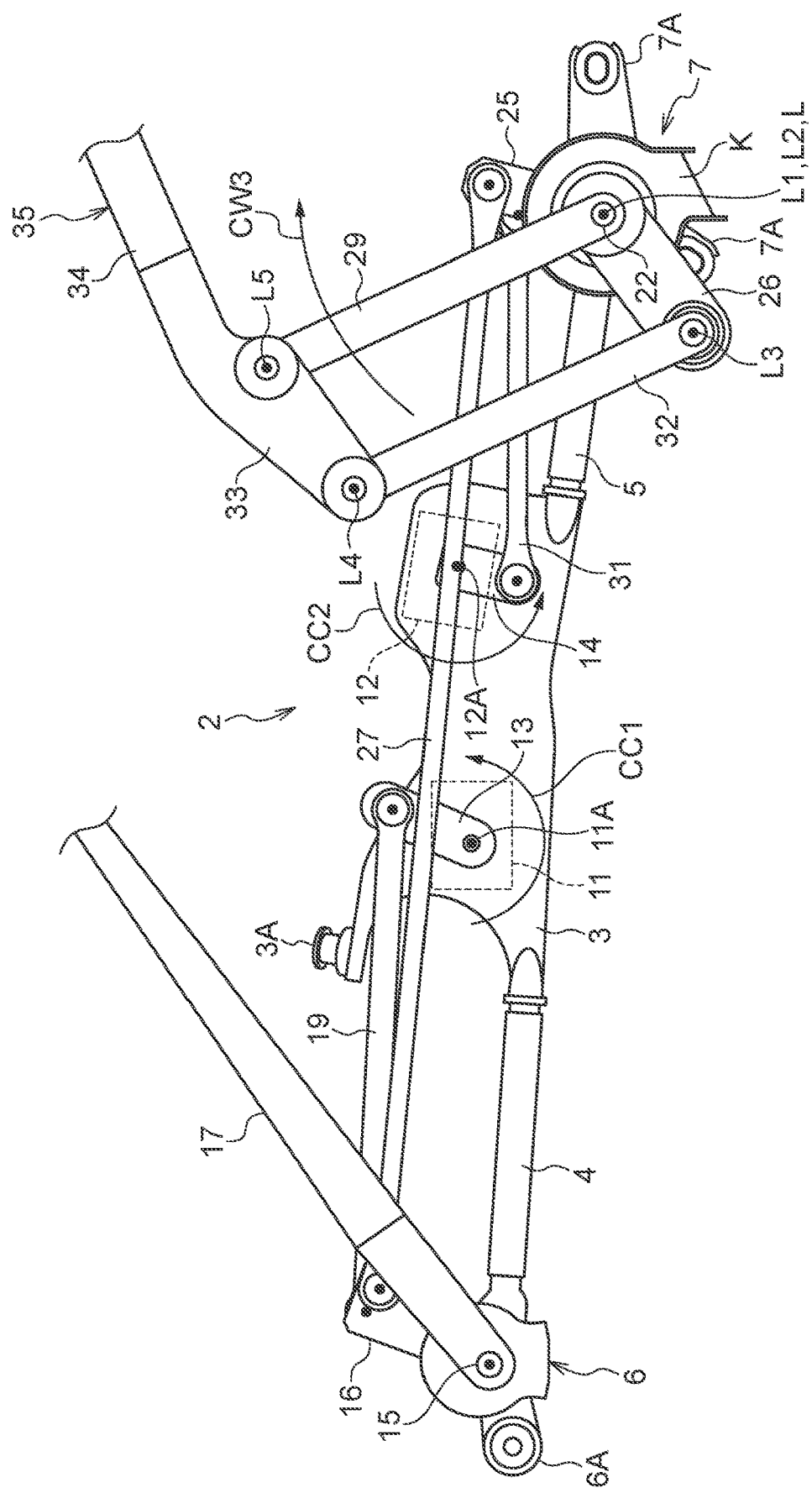
FIG. 4 is a plan view illustrating progression of an operation of a vehicle wiper device according to the first exemplary embodiment of the present disclosure.
Figure 5:
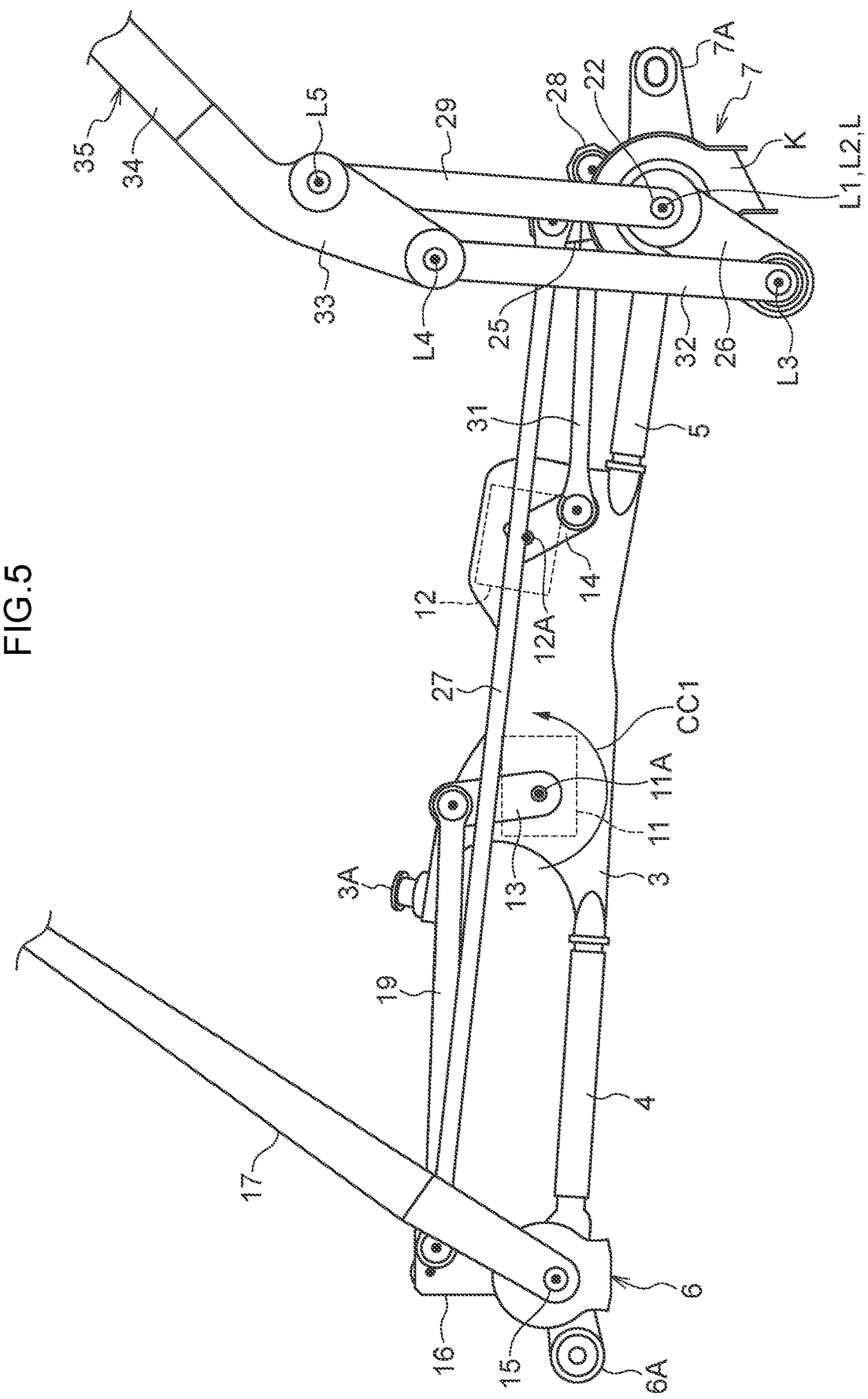
FIG. 5 is a plan view illustrating progression of an operation of a vehicle wiper device according to the first exemplary embodiment of the present disclosure.
Figure 6:
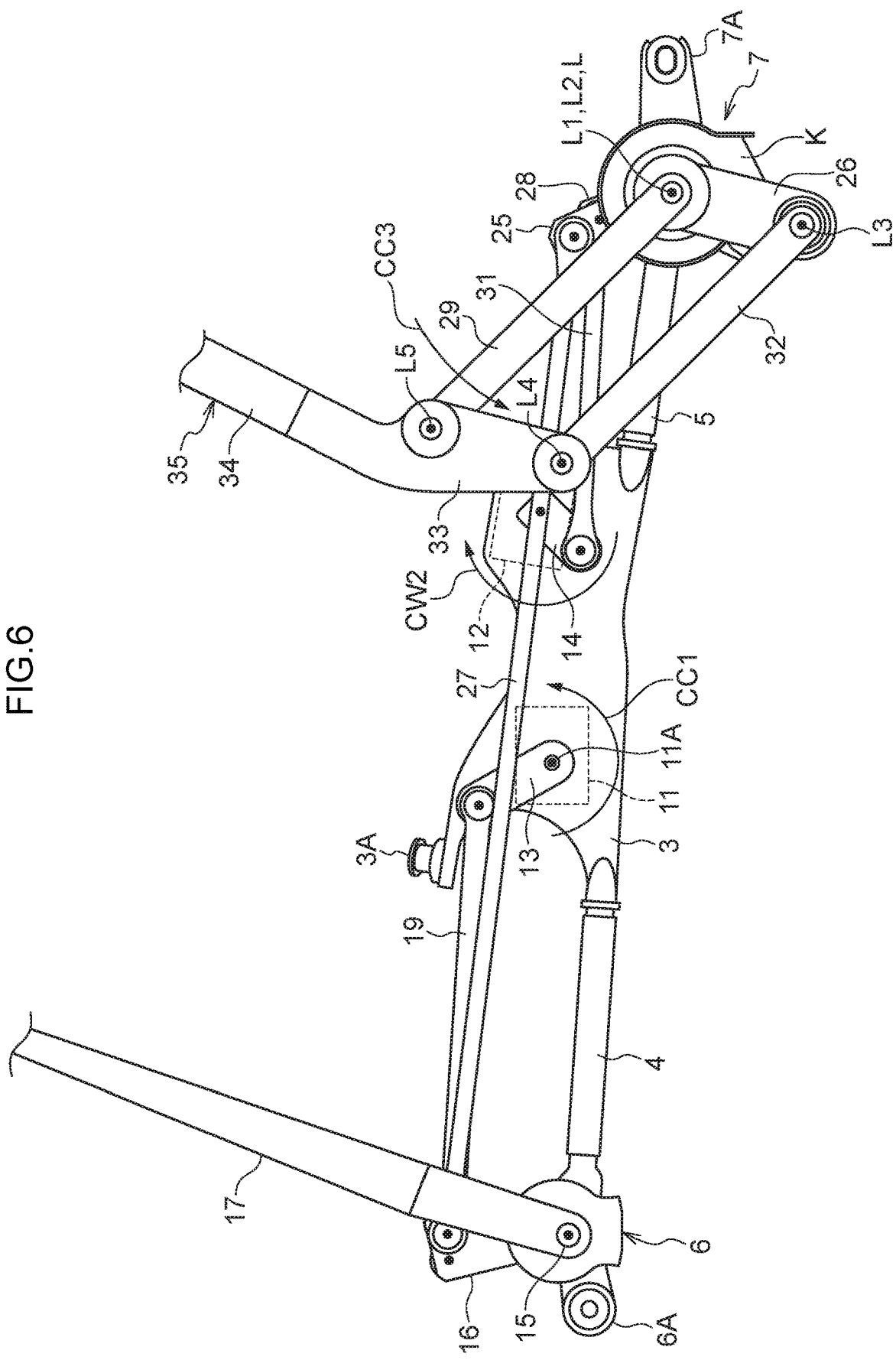
FIG. 6 is a plan view illustrating progression of an operation of a vehicle wiper device according to the first exemplary embodiment of the present disclosure.

The fifth axis L5 is a pivot point for the movement of the front passenger seat side wiper arm 35. The front passenger seat side wiper arm 35 moves back and forth over the windshield glass 1, rotated about the fifth axis L5 by drive force from the first motor 11. As illustrated in FIG. 4 to FIG. 6, via the substantially parallelogram shaped link mechanism configured by the first drive lever 26, the second drive lever 29, the first following lever 32, and the arm head 33, the second motor 12 moves the fifth axis L5 to a higher position on the windshield glass 1 than the position illustrated in FIG. 2, FIG. 7, and FIG. 8. The front passenger seat side wiper arm 35 appears to extend due to this movement of the fifth axis L5. When both the first motor 11 and the second motor 12 are in operation, the front passenger seat side wiper blade 36 wipes the wiping range Z2.

Figure 7:
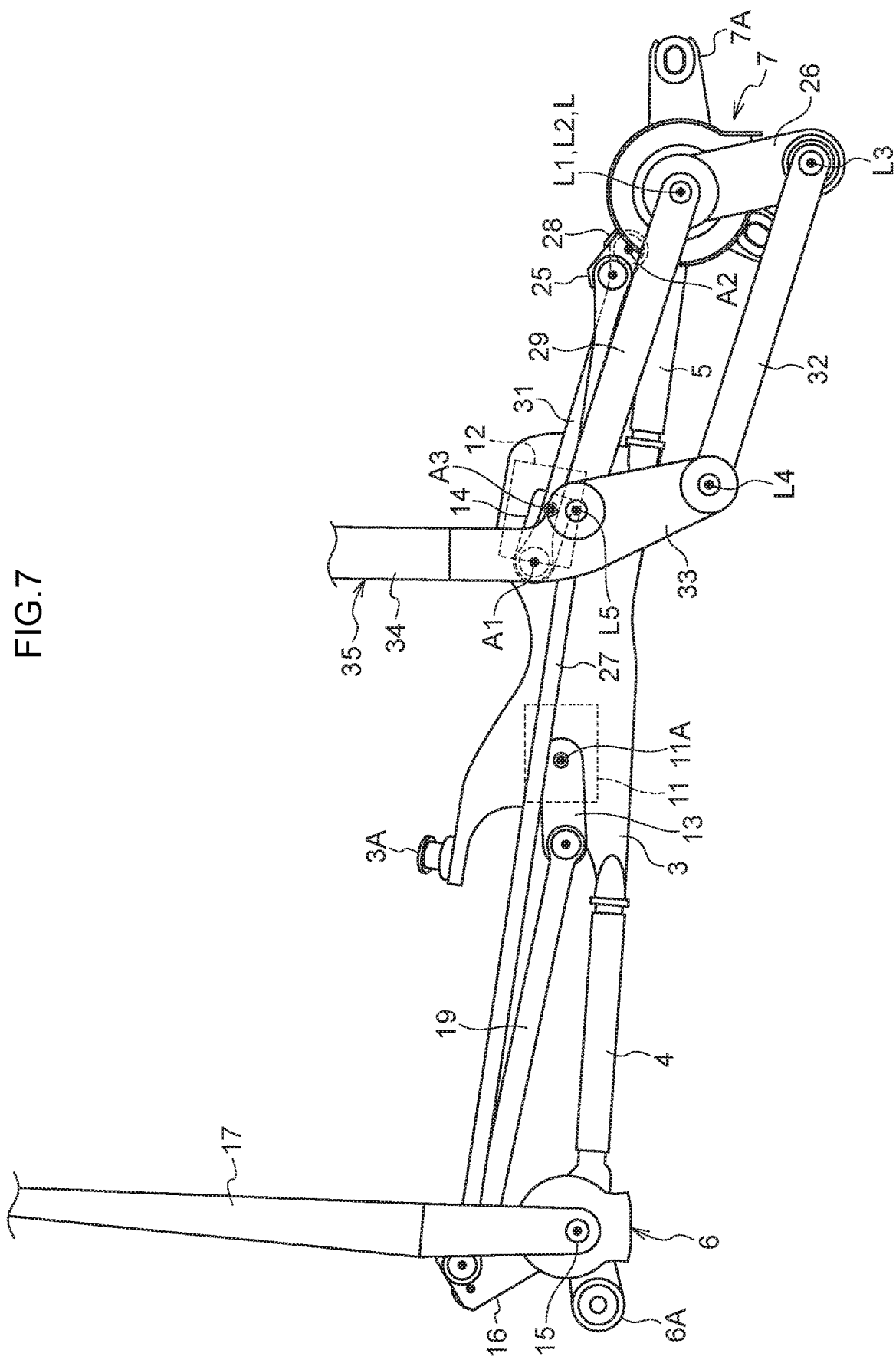
FIG. 7 is a plan view illustrating progression of an operation of a vehicle wiper device according to the first exemplary embodiment of the present disclosure.
Figure 8:
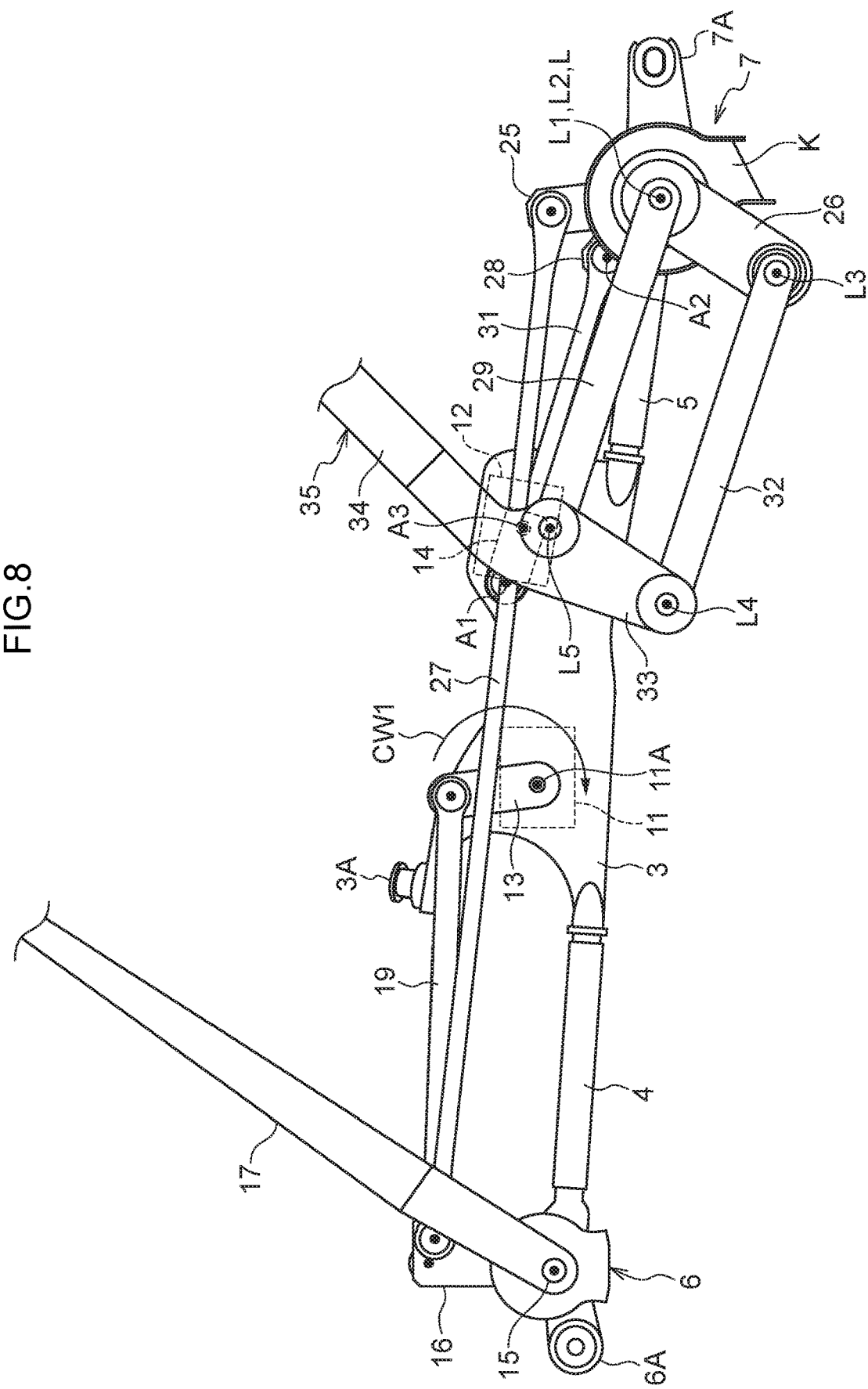
FIG. 8 is a plan view illustrating progression of an operation of a vehicle wiper device according to the first exemplary embodiment of the present disclosure.

When the second motor 12 is not operated and the first motor 11 operates on its own, the fifth axis L5 does not move from the position illustrated in FIG. 2, FIG. 7, and FIG. 8 (referred to hereafter as a "first position"). Accordingly, the front passenger seat side wiper arm 35 moves between the lower return position P2P and the upper return position P1P so as to describe a substantially circular arc shaped trajectory centered on the stationary fifth axis L5 that has a position that does not change, and the front passenger seat side wiper blade 36 wipes the substantially fan-shaped wiping range Z1.

In the present exemplary embodiment, when it is necessary to wipe the windshield glass 1 over a broad area, as the front passenger seat side wiper blade 36 moves on an outward path from the lower return position P2P toward the upper return position P1P, the first motor 11 and the second motor 12 are both controlled in order to wipe the wiping range Z2. When the front passenger seat side wiper blade 36 changes direction at the upper return position P1P and moves on a return path toward the lower return position P2P, the first motor 11 and the second motor 12 are both controlled in order to wipe the wiping range Z1. As the front passenger seat side wiper blade 36 moves back and forth between the lower return position P2P and the upper return position P1P, the wiping range Z2 is wiped on the outward path and the wiping range Z1 is wiped on the return path. Wiping both wiping ranges enables the windshield glass 1 to be wiped over a broad range. Alternatively, wiping the wiping range Z1 on the outward path and wiping the wiping range Z2 on the return path as the front passenger seat side wiper blade 36 moves back and forth between the lower return position P2P and the upper return position P1P also enables the windshield glass 1 to be wiped over a broad range. Alternatively, configuration may be made so as to wipe the wiping range Z2 on both the outward path and the return path.

Explanation follows regarding operation of the wiper device 2 according to the present exemplary embodiment. In the present exemplary embodiment, the driver's seat side wiper arm 17 and the driver's seat side wiper blade 18 only move about the driver's seat side pivot shaft 15 accompanying rotation of the first motor 11. Accordingly, in the following explanation, detailed explanation is given regarding operation of the front passenger seat side wiper arm 35 and the front passenger seat side wiper blade 36.

FIG. 2 illustrates a state in which the front passenger seat side wiper blade 36 is positioned at the lower return position P2P, and a state in which the front passenger seat side wiper arm 35 is at an inactive position. In this state, when the washer switch 62 or the mode changer switch previously described is switched ON, under the control of the control circuit 52 the first output shaft 11A of the first motor 11 rotates in a rotation direction CC1, illustrated in FIG. 4, thereby starting rotation of the first drive lever 26 and starting rotational movement of the front passenger seat side wiper arm 35 about the fifth axis L5. At the same time, the second output shaft 12A of the second motor 12 starts rotating in a rotation direction CC2, illustrated in FIG. 4. Note that in the present exemplary embodiment, the rotation direction CC1 rotation of the first output shaft 11A and the rotation direction CC2 rotation of the second output shaft 12A correspond to forward rotation of the respective output shafts.

FIG. 4 illustrates a state in which the front passenger seat side wiper blade 36 has wiped partway (approximately one quarter of the outward journey) across the windshield glass 1. In the present exemplary embodiment, when the first motor 11 starts to rotate in the rotation direction CC1, drive force from the rotation direction CC2 rotation of the second motor 12 is transmitted to the second drive lever 29. The drive force of the second motor 12 transmitted to the second drive lever 29 moves the second drive lever 29 in a movement direction CW3, such that the second drive lever 29 moves the fifth axis L5 configuring the pivot point of the front passenger seat side wiper arm 35 upward and toward the front passenger seat side of the windshield glass 1.

FIG. 5 illustrates a case in which the first output shaft 11A has rotated as far as an intermediate rotation angle between 0° and the first predetermined angle, such that the first drive lever 26 has rotated further and the front passenger seat side wiper blade 36 has reached substantially midway on its journey (outward journey) between the lower return position P2P and the upper return position P1P. FIG. 5 also illustrates a state in which the second output shaft 12A of the second motor 12 has rotated as far as the second predetermined rotation angle in the rotation direction CC2 illustrated in FIG. 4. Since the second output shaft 12A has reached its maximum forward rotation angle, the fifth axis L5 configuring the pivot point of the front passenger seat side wiper arm 35 is raised to its highest position (second position) by the second drive crank arm 14, the third coupling rod 31, the second front passenger seat side swing lever 28, and the second drive lever 29. As a result, as illustrated in FIG. 1, a leading end portion of the front passenger seat side wiper blade 36 is moved as far as a position close to an upper corner on the front passenger seat side of the windshield glass 1. Note that the intermediate rotation angle mentioned above is approximately half of the first predetermined rotation angle, but is set on a case-by-case basis according to such factors as the shape of the windshield glass 1. Note that the second position corresponds to the highest position at which the fifth axis L5 is disposed for each ratio of change. To explain in more detail, the second position is the position where the fifth axis L5 is disposed when the first output shaft 11A has rotated as far as the intermediate rotation angle between 0° and the first predetermined rotation angle as the front passenger seat side wiper blade wipes a wiping range that is broader than the wiping range Z1 (for example, the wiping range Z2).

FIG. 6 illustrates a case in which the first drive lever 26 has rotated further, such that the front passenger seat side wiper blade 36 has covered approximately three-quarters of the journey (outward journey) between the lower return position P2P and the upper return position P1P. In FIG. 6, the rotation direction of the first output shaft 11A of the first motor 11 is the same as that illustrated in FIG. 4 and FIG. 5. However, the second output shaft 12A of the second motor 12 is rotating in a rotation direction CW2 (backward rotation), this being the opposite rotation direction to that illustrated in FIG. 4 and FIG. 5. Since the second output shaft 12A is rotating in the rotation direction CW2, the second drive lever 29 moves in a movement direction CC3, and the fifth axis L5 configuring the pivot point of the front passenger seat side wiper arm 35 moves downward from the second position. As a result, the leading end portion of the front passenger seat side wiper blade 36 moves across the windshield glass 1 so as to describe the trajectory illustrated by dashed lines at the top of the wiping range Z2 in FIG. 1, thereby wiping the wiping range Z2.

FIG. 7 illustrates a case in which the first output shaft 11A of the first motor 11 has rotated forward as far as the first predetermined rotation angle, and the second output shaft 12A of the second motor 12 has rotated backward by the second predetermined rotation angle. The first output shaft 11A of the first motor 11 has reached its maximum forward rotation angle, and therefore the driver's seat side wiper arm 17 and the driver's seat side wiper blade 18 reach the upper return position P1D. The second output shaft 12A of the second motor 12 has rotated backward by the second predetermined rotation angle from the state illustrated in FIG. 5 (a state in which the second output shaft 12A has rotated forward and reached the second predetermined rotation angle), such that the fifth axis L5 configuring the pivot point of the front passenger seat side wiper arm 35 has returned to the first position illustrated in FIG. 2, this being its position prior to the second output shaft 12A of the second motor 12 starting to rotate forward. As a result, the front passenger seat side wiper arm 35 and the front passenger seat side wiper blade 36 reach the same upper return position P1P as that of the wiping range Z1 that is wiped when the second motor 12 is not driven.

FIG. 8 illustrates a state during movement of the driver's seat side wiper arm 17 and the driver's seat side wiper blade 18, as well as the front passenger seat side wiper arm 35 and the front passenger seat side wiper blade 36, from the upper return positions P1D, P1P toward the lower return positions P2D, P2P (a return journey). On the return path, the first output shaft 11A of the first motor 11 rotates backward so as to rotate in a rotation direction CW1, this being the opposite direction to that illustrated in FIG. 2 and in FIG. 4 to FIG. 7. However, the second output shaft 12A of the second motor 12 does not rotate, and therefore the fifth axis L5 configuring the pivot point of the front passenger seat side wiper arm 35 does not move from the first position, such that the front passenger seat side wiper arm 35 describes a substantially circular arc shaped trajectory as a result of the backward rotation of the first output shaft 11A of the first motor 11. As a result, the front passenger seat side wiper blade 36 that is coupled to the leading end of the front passenger seat side wiper arm 35 wipes the wiping range Z1.

Figure 9:
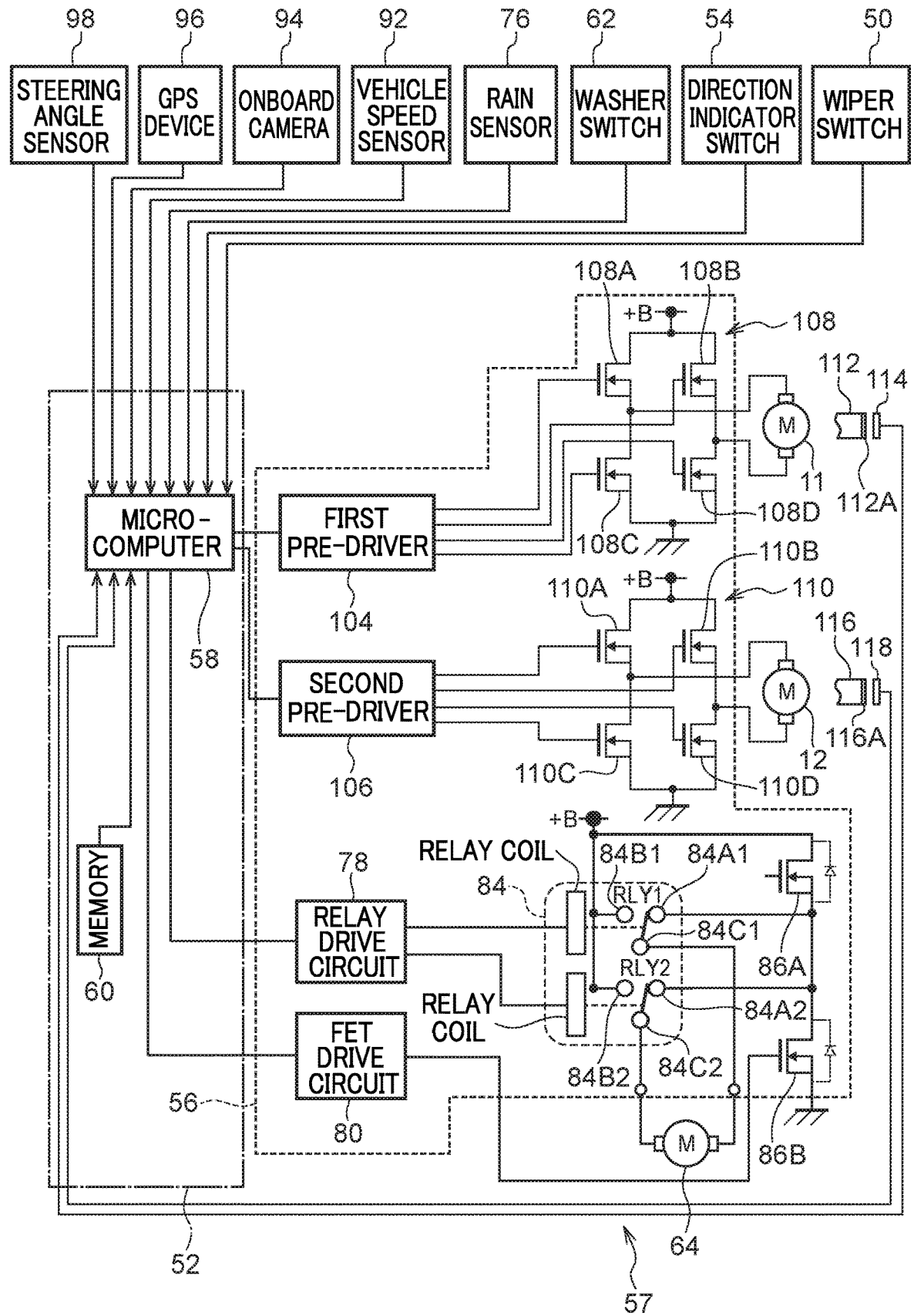
FIG. 9 is a schematic circuit diagram illustrating circuitry of a wiper system according to the first exemplary embodiment of the present disclosure.

FIG. 9 is a schematic circuit diagram illustrating circuitry of the wiper system 100 according to the present exemplary embodiment. As illustrated in FIG. 9, the wiper system 100 includes the control circuit 52 and the drive circuit 56.

The control circuit 52 includes the microcomputer 58 and the memory 60 as described above. Connected to the microcomputer 58 via the vehicle ECU 90 (not illustrated in FIG. 9) are the wiper switch 50, the direction indicator switch 54, the washer switch 62, the rain sensor 76, the vehicle speed sensor 92, the onboard camera 94, the GPS device 96, and the steering angle sensor 98.

The drive circuit 56 includes a first pre-driver 104 and a first motor drive circuit 108 to drive the first motor 11, and a second pre-driver 106 and a second motor drive circuit 110 to drive the second motor 12. The drive circuit 56 also includes a relay drive circuit 78, a FET drive circuit 80, and a washer motor drive circuit 57 to drive the washer motor 64.

The microcomputer 58 of the control circuit 52 controls rotation of the first motor 11 by using the first pre-driver 104 to switch ON and OFF switching elements configuring the first motor drive circuit 108, and also controls rotation of the second motor 12 by using the second pre-driver 106 to switch ON and OFF switching elements configuring the second motor drive circuit 110. The microcomputer 58 also controls rotation of the washer motor 64 by controlling the relay drive circuit 78 and the FET drive circuit 80.

In cases in which the first motor 11 and the second motor 12 are configured by brushed DC motors, the first motor drive circuit 108 and the second motor drive circuit 110 include four switching elements each. The switching elements are, for example, N-type field-effect transistors (FET).

As illustrated in FIG. 9, the first motor drive circuit 108 includes FETs 108A to 108D. The drain of the FET 108A is connected to a power source (+B), the gate of the FET 108A is connected to the first pre-driver 104, and the source of the FET 108A is connected to one end portion of the first motor 11. The drain of the FET 108B is connected to the power source (+B), the gate of the FET 108B is connected to the first pre-driver 104, and the source of the FET 108B is connected to the other end portion of the first motor 11. The drain of the FET 108C is connected to the one end portion of the first motor 11, the gate of the FET 108C is connected to the first pre-driver 104, and the source of the FET 108C is connected to earth. The drain of the FET 108D is connected to the other end portion of the first motor 11, the gate of the FET 108D is connected to the first pre-driver 104, and the source of the FET 108D is connected to earth.

The first pre-driver 104 controls drive of the first motor 11 by switching control signals supplied to the gates of the respective FETs 108A to 108D according to control signals from the microcomputer 58. Namely, when the first pre-driver 104 rotates the first output shaft 11A of the first motor 11 in a predetermined direction (forward rotation), the first pre-driver 104 switches ON the FET 108A and the FET 108D as a pair, and when the first pre-driver 104 rotates the first output shaft 11A of the first motor 11 in the opposite direction to the predetermined direction (backward rotation), the first pre-driver 104 switches ON the FET 108B and the FET 108C as a pair. The first pre-driver 104 also performs PWM by switching the FET 108A and the FET 108D ON and OFF intermittently based on control signals from the microcomputer 58.

The first pre-driver 104 adjusts the ON/OFF duty ratio of the FET 108A and the FET 108D by PWM so as to control the rotation speed of the forward rotation of the first motor 11. The greater the duty ratio, the higher the effective voltage applied to the terminal of the first motor 11 during forward rotation, thus increasing the rotation speed of the first motor 11.

Similarly, the first pre-driver 104 adjusts the ON/OFF duty ratio of the FET 108B and the FET 108C by PWM so as to control the rotation speed of the backward rotation of the first motor 11. The greater the duty ratio, the higher the effective voltage applied to the terminal of the first motor 11 during backward rotation, thus increasing the rotation speed of the first motor 11.

The second motor drive circuit 110 includes FETs 110A to 110D. The drain of the FET 110A is connected to the power source (+B), the gate of the FET 110A is connected to the second pre-driver 106, and the source of the FET 110A is connected to one end portion of the second motor 12. The drain of the FET 110B is connected to the power source (+B), the gate of the FET 110B is connected to the second pre-driver 106, and the source of the FET 110B is connected to another end portion of the second motor 12. The drain of the FET 110C is connected to the one end portion of the second motor 12, the gate of the FET 110C is connected to the second pre-driver 106, and the source of the FET 110C is connected to earth. The drain of the FET 110D is connected to the other end portion of the second motor 12, the gate of the FET 110D is connected to the second pre-driver 106, and the source of the FET 110D is connected to earth.

The second pre-driver 106 controls drive of the second motor 12 by switching control signals supplied to the gates of the respective FETs 110A to 110D according to control signals from the microcomputer 58. Namely, when the second pre-driver 106 rotates the second output shaft 12A of the second motor 12 in a predetermined direction (forward rotation), the second pre-driver 106 switches ON the FET 110A and the FET 110D as a pair, and when the second pre-driver 106 rotates the second output shaft 12A of the second motor 12 in the opposite direction to the predetermined direction (backward rotation), the second pre-driver 106 switches ON the FET 110B and the FET 110C as a pair. Similarly to the first pre-driver 104 described above, the second pre-driver 106 also controls the rotation speed of the second motor 12 by performing PWM based on control signals from the microcomputer 58.

A bipolar sensor magnet 112A is fixed to an output shaft end portion 112 of the first output shaft 11A within the speed reduction mechanism of the first motor 11. A first absolute angle sensor 114 is provided opposing the sensor magnet 112A.

A bipolar sensor magnet 116A is fixed to an output shaft end portion 116 of the second output shaft 12A inside the speed reduction mechanism of the second motor 12. A second absolute angle sensor 118 is provided opposing the sensor magnet 116A.

The first absolute angle sensor 114 detects the magnetic field of the sensor magnet 112A, and the second absolute angle sensor 118 detects the magnetic field of the sensor magnet 116A. The first absolute angle sensor 114 and the second absolute angle sensor 118 output signals corresponding to the strength of the detected magnetic fields. The microcomputer 58 computes the rotation angles, rotation positions, rotation directions, and rotation speeds of the first output shaft 11A of the first motor 11 and of the second motor 12 based on the respective signals output from the first absolute angle sensor 114 and the second absolute angle sensor 118.

The position of the driver's seat side wiper blade 18 between the lower return position P2D and the upper return position P1D can be computed from the rotation angle of the first output shaft 11A of the first motor 11. Moreover, the level of the apparent extension (level of change) of the front passenger seat side wiper arm 35 can be computed from the rotation angle of the second output shaft 12A of the second motor 12. The microcomputer 58 controls the rotation angle of the second output shaft 12A based on the position of the driver's seat side wiper blade 18 between the lower return position P2D and the upper return position P1D as computed from the rotation angle of the first output shaft 11A, in order to align the action of the first motor 11 and the action of the second motor 12. For example, the memory 60 is pre-stored with a map (for example, a second output shaft rotation angle map, described below) in which positions of the driver's seat side wiper blade 18 between the lower return position P2D and the upper return position P1D (or rotation angles of the first output shaft 11A) are associated with rotation angles of the second output shaft 12A. The rotation angle of the second output shaft 12A is controlled according to this map in accordance with the rotation angle of the first output shaft 11A.

Figure 10:
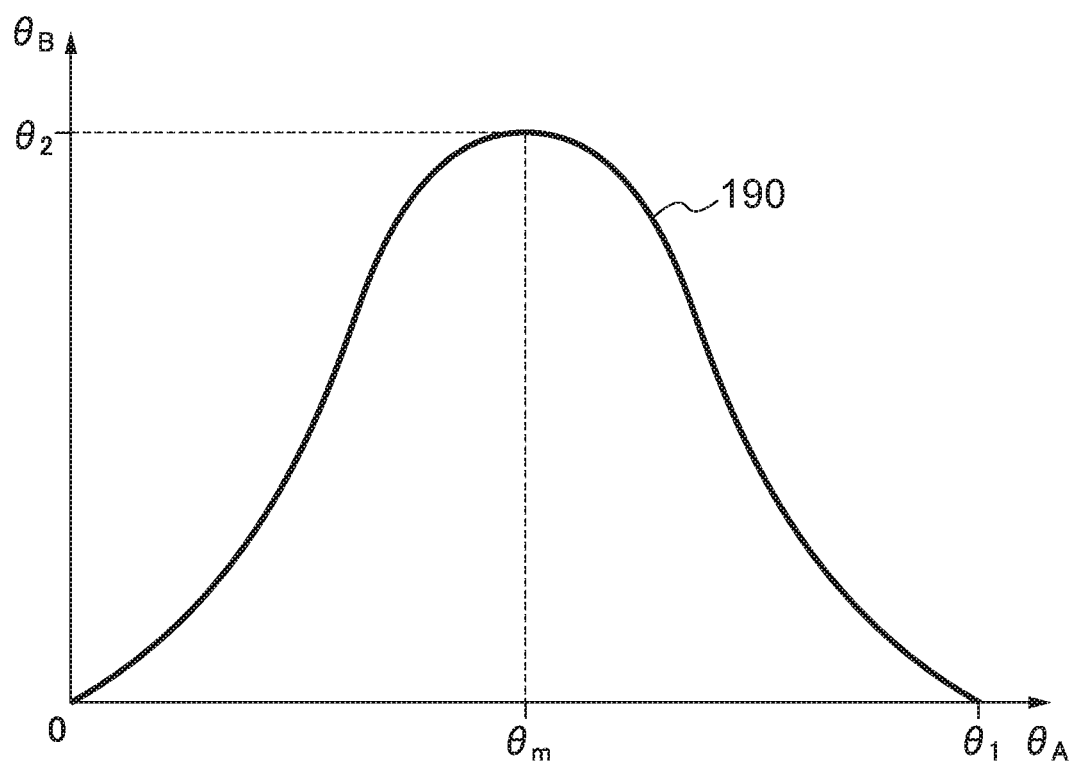
FIG. 10 illustrates an example of a second output shaft rotation angle map that defines rotation angles for a second output shaft according to rotation angles of a first output shaft in the first exemplary embodiment of the present disclosure.

FIG. 10 illustrates an example of the second output shaft rotation angle map according to the present exemplary embodiment, in which rotation angles of the second output shaft 12A are defined in accordance with rotation angles of the first output shaft 11A. In FIG. 10, the horizontal axis represents rotation angles of the first output shaft 11A as first output shaft rotation angles $\theta_A$, and the vertical axis represents rotation angles of the second output shaft 12A as second output shaft rotation angles $\theta_B$. The origin O in FIG. 10 represents a state in which the front passenger seat side wiper blade 36 is located at the lower return position P2P. $\theta_1$ in FIG. 10 represents a state in which the first output shaft 11A has rotated by a first predetermined rotation angle $\theta_1$ such that the front passenger seat side wiper blade 36 is located at the upper return position P1P.

When the first absolute angle sensor 114 detects that rotation of the first output shaft 11A of the first motor 11 has started, the microcomputer 58 cross references the rotation angle of the first output shaft 11A as detected by the first absolute angle sensor 114 against the second output shaft rotation angle map. By this cross referencing, the second output shaft rotation angle $\theta_B$ corresponding to the first output shaft rotation angle $\theta_A$ detected by the first absolute angle sensor 114 is computed based on the angle indicated by the curve 190 in FIG. 10, and the rotation angle of the second output shaft 12A of the second motor 12 is controlled so as to become the computed second output shaft rotation angle $\theta_B$.

More specifically, when the rotation angle of the first output shaft 11A of the first motor 11 detected by the first absolute angle sensor 114 starts to change in the forward rotation direction from 0°, the microcomputer 58 determines that the front passenger seat side wiper blade 36 has started to move from the lower return position P2P, and starts forward rotation of the second output shaft 12A. As described above, the microcomputer 58 uses the second output shaft rotation angle to determine the rotation angle of the second output shaft 12A in accordance with the rotation angle of the first output shaft 11A map, and the microcomputer 58 monitors the rotation angle of the second output shaft 12A based on signals from the second absolute angle sensor 118 and controls the rotation of the second motor 12 so as to be the rotation angle determined using the second output shaft rotation angle map. Although this depends on the settings of the second output shaft rotation angle map, as illustrated in FIG. 10, the forward rotation angle of the second output shaft 12A is made to become the second predetermined rotation angle $\theta_2$ when the first output shaft rotation angle $\theta_A$ is an intermediate rotation angle $\theta_m$ between 0° and the first predetermined rotation angle $\theta_1$. Bringing the forward rotation angle of the second output shaft 12A to the second predetermined rotation angle $\theta_2$ moves the fifth axis L5 configuring the pivot point of the front passenger seat side wiper arm 35 upward (to the second position) on the front passenger seat side of the windshield glass 1.

After the forward rotation angle of the second output shaft 12A has reached the second predetermined rotation angle $\theta_2$, the rotation angle of the second output shaft 12A is reduced according to the second output shaft rotation angle map. Specifically, the second output shaft 12A is rotated backward by the second predetermined rotation angle $\theta_2$ until the rotation angle of the first output shaft 11A of the first motor 11 reaches the first predetermined rotation angle $\theta_1$, and the front passenger seat side wiper blade 36 reaches the upper return position P1P, thereby reducing the rotation angle of the second output shaft 12A to 0°. This backward rotation of the second output shaft 12A returns the fifth axis L5 configuring the pivot point of the front passenger seat side wiper arm 35 to its original position (the first position).

A case in which the wiping range Z2 is wiped as the front passenger seat side wiper blade 36 is moved from the lower return position P2P toward the upper return position P1P has been described above. In cases in which the wiping range Z2 is wiped as the front passenger seat side wiper blade 36 is moved from the upper return position P1P to the lower return position P2P, when the rotation angle of the first output shaft 11A detected by the first absolute angle sensor 114 starts to change in the backward rotation direction from 0°, the front passenger seat side wiper blade 36 is determined to have started moving away from the upper return position P1P, and forward rotation of the second output shaft 12A of the second motor 12 is started. Note that although the curve 190 has left-right symmetry about the intermediate rotation angle $\theta_m$ in the second output shaft rotation angle map illustrated in FIG. 10, there is no limitation thereto. The curve of the map is set on a case-by-case basis according to such factors as the shape of the windshield glass 1.

Moreover, the microcomputer 58 may perform control to change the wiping speeds of the wiper blades and so on, based on the position of the driver's seat side wiper blade 18 between the lower return position P2D and the upper return position P1D and on the level of change of the wiping range of the front passenger seat side wiper arm 35. Explanation follows regarding an example of wiping speed control in a case in which the rotation angle of the second output shaft 12A is set to a large second predetermined rotation angle, and the front passenger seat side wiper arm 35 is set with a large level of change in the wiping range. In such a case, the rotation speed of the first output shaft 11A is gradually slowed as the rotation angle of the first output shaft 11A of the first motor 11 approaches the intermediate rotation angle. Moreover, the rotation speed of the first output shaft 11A is controlled so as to be very low when the rotation angle of the first output shaft 11A has reached the intermediate rotation angle, namely, when the front passenger seat side wiper arm 35 is at its most extended. A rotation speed map for the first output shaft 11A defined corresponding to the rotation angle of the first output shaft 11A or the like (not illustrated in the drawings) is employed to control the rotation speed of the first output shaft 11A. Moreover, the rotation speed of the second output shaft 12A is also controlled according to the rotation speed of the first output shaft 11A. For example, by employing a second output shaft rotation angle map such as that illustrated in FIG. 10, the rotation of the second output shaft 12A can be aligned with the rotation of the first output shaft 11A, thereby enabling the rotation speed of the second output shaft 12A to be controlled according to the increase or decrease in the rotation speed of the first output shaft 11A. Such control enables the speed at which the front passenger seat side wiper arm 35 extends, as well as the wiping speed of the front passenger seat side wiper blade 36, to be made gentler, such that an occupant is less likely to be distracted by the front passenger seat side wiper arm 35 appearing to suddenly grow longer.

The washer motor drive circuit 57 includes a relay unit 84 including two inbuilt relays RLY1, RLY2, and two FETs 86A, 86B. Relay coils of the relays RLY1, RLY2 of the relay unit 84 are respectively connected to the relay drive circuit 78. The relay drive circuit 78 switches the relays RLY1, RLY2 ON/OFF (excites/stops excitation of the relay coils). When the relay coils of the relays RLY1, RLY2 are not excited, common terminals 84C1, 84C2 are maintained in a state respectively connected to first terminals 84A1, 84A2 (an OFF state), and when the relay coils are excited, the common terminals 84C1, 84C2 are switched to a state respectively connected to the second terminals 84B1, 84B2. The common terminal 84C1 of the relay RLY1 is connected to one end of the washer motor 64, and the common terminal 84C2 of the relay RLY2 is connected to the other end of the washer motor 64. Moreover, the first terminals 84A1, 84A2 of the relays RLY1, RLY2 are respectively connected to the drain of the FET 86B, and second terminals 84B1, 84B2 of the relays RLY1, RLY2 are respectively connected to the power source (+B).

The gate of the FET 86B is connected to the FET drive circuit 80, and the source of the FET 86B is connected to earth. The ON/OFF duty ratio of the FET 86B is controlled by the FET drive circuit 80. Moreover, the FET 86A is provided between the drain of the FET 86B and the power source (+B). The gate of the FET 86A is not input with control signals, and so the FET 86A is not switched ON/OFF. The FET 86A is provided to serve the role of a surge-absorbing parasitic diode.

The relay drive circuit 78 and the FET drive circuit 80 switch the two relays RLY1, RLY2 and the FET 86B ON/OFF in order to control drive of the washer motor 64. Namely, when an output shaft of the washer motor 64 is rotated in a predetermined direction (forward rotation), the relay drive circuit 78 switches the relay RLY1 ON (and the relay RLY2 OFF), and the FET drive circuit 80 switches the FET 86B ON at a predetermined duty ratio. This control is used to control the rotation speed of the output shaft of the washer motor 64.

Figure 11:
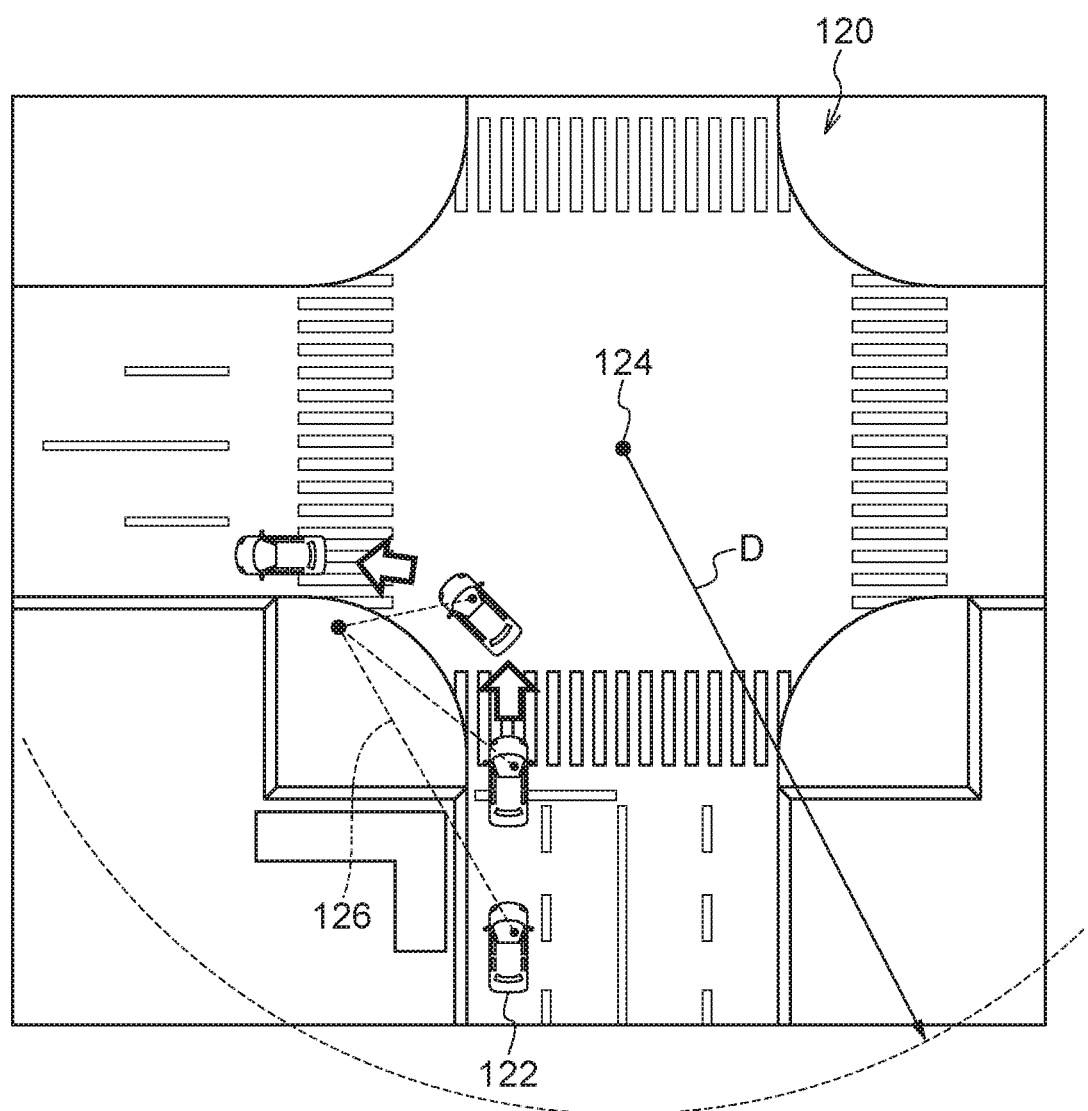
FIG. 11 is a birds-eye view of an example of a state in which a vehicle has come into a crossroad and is in the process of turning left.

FIG. 11 is a birds-eye view illustrating an example of a state in which a vehicle 122 has come into a crossroad 120 and is in the process of turning left. The gaze 126 of the driver of the vehicle 122 that is turning left is focused toward the front left of the vehicle in order to avoid an incident with a pedestrian or the like. In the present exemplary embodiment, as an example, when the vehicle 122 comes within a predetermined distance D of a center 124 of the crossroad 120 and the vehicle 122 turns left, this is determined to be a state in which a broad field of view should be secured on the front passenger seat side (a state in which the orientation of the vehicle shifts toward the front passenger seat side, or in other words a state in which the gaze of the driver shifts toward the front passenger seat side). In such a situation, the operating range of the front passenger seat side wiper arm 35 is changed such that the front passenger seat side wiper blade 36 wipes the wiping range Z2. The predetermined distance D is, for example, from 20 m to 30 m. However, many other values may be applied as the predetermined distance D.

Figure 12:
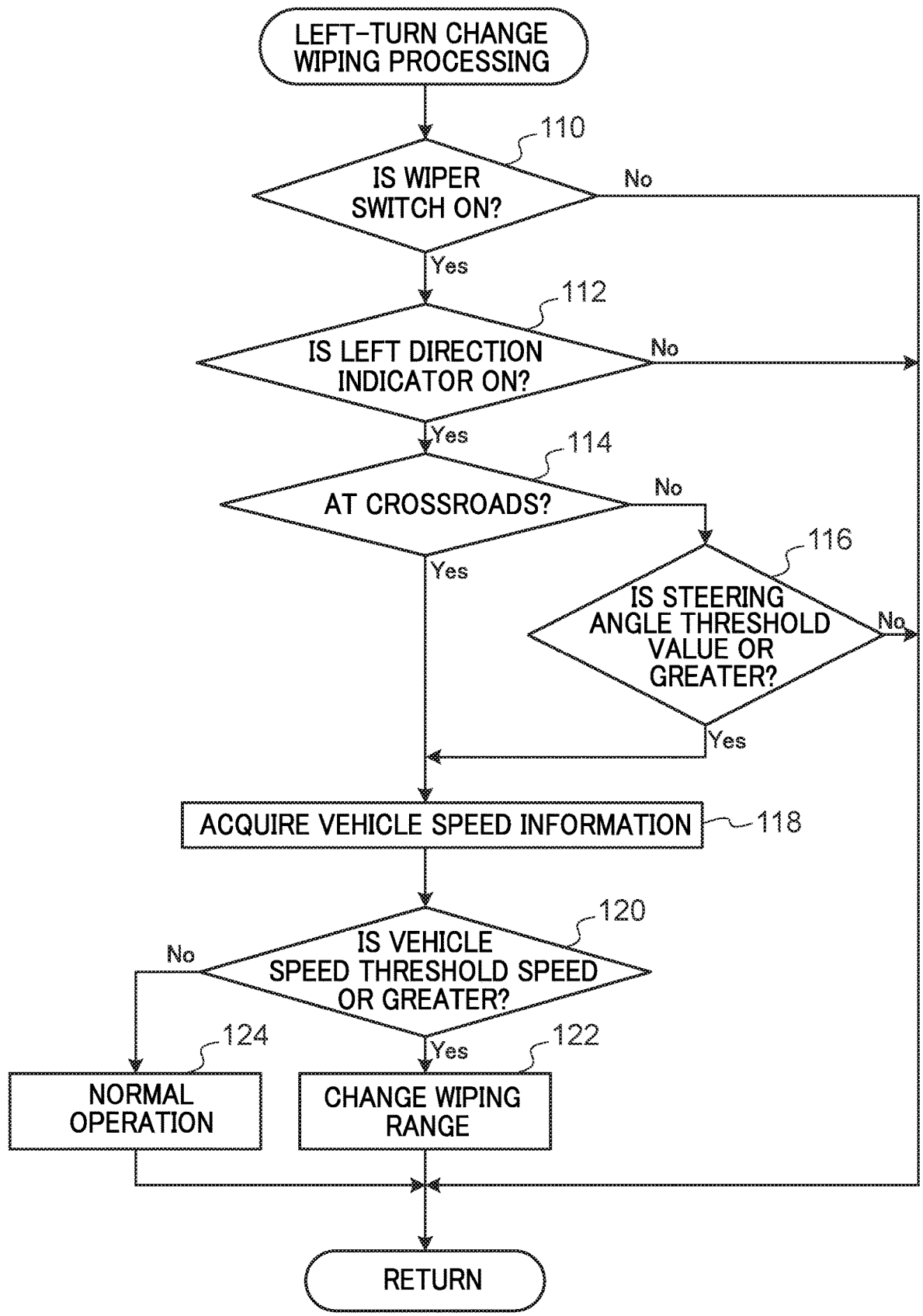
FIG. 12 is a flowchart illustrating an example of left-turn wiping processing to detect a left turn of a vehicle and change a wiping range on a front passenger seat side of a windshield glass in a wiper system according to the first exemplary embodiment of the present disclosure.

Explanation follows regarding control of the wiper system 100 according to the present exemplary embodiment. FIG. 12 is a flowchart illustrating an example of left-turn wiping processing to detect a left turn of the vehicle 122 and change the wiping range of the front passenger seat side of the windshield glass 1 in the wiper system 100 according to the present exemplary embodiment. The sequence illustrated in FIG. 12 is processed by the microcomputer 58 inside the control circuit 52.

At step 110 in FIG. 12, determination is made as to whether or not the wiper switch 50 has been switched ON. Processing transitions to step 112 in cases in which determination is affirmative, and processing returns to the beginning in cases in which determination is negative.

At step 112, determination is made as to whether or not the direction indicator switch 54 has been switched ON to indicate a left turn. Processing transitions to step 114 in cases in which determination is affirmative, and processing returns to the beginning in cases in which determination is negative.

At step 114, determination is made as to whether or not the vehicle 122 has come within the predetermined distance D of the center 124 of a crossroad 120. Whether or not the vehicle 122 is approaching a crossroad 120 and is about to come within the predetermined distance D is determined based on the current position of the vehicle 122 computed by the GPS device. The current position of the vehicle 122 is computed by the GPS device 96 based on acquired GPS satellite signals. The GPS device 96 references the computed current position of the vehicle 122 against map data provided to the GPS device 96 in order to determine whether or not the vehicle 122 is within the predetermined distance D of the center 124 of the crossroad 120 in the map data.

Alternatively, if the GPS device 96 is capable of registering a course of the vehicle 122 and is capable of registering the position of the center 124 of the crossroad 120 as a landmark on this course, determination as to whether or not the vehicle 122 is within the predetermined distance D of the center 124 of the crossroad 120 may be made by referencing the current position of the vehicle 122 against the registered course and the position of the landmark.

Processing transitions to step 118 in cases in which determination is affirmative at step 114. In cases in which determination is negative at step 114, at step 116, determination is made as to whether or not the steering angle of the vehicle 122 in a direction to turn left is at a threshold value or greater. The steering angle of the vehicle 122 is computed by the vehicle ECU 90 or the microcomputer 58 based on a rotation angle of the steering wheel, detected by the steering angle sensor 98. Various values may be employed as the steering angle threshold value at step 116, these values representing an angle that enables the vehicle 122 to be determined to be turning left at a crossroad 120, and such values generally being larger than those when changing lanes or the like. The specific values of the threshold value vary according to vehicle model and vehicle specifications, and are set on a case-by-case basis according to the vehicle model and vehicle specifications.

Processing transitions to step 118 in cases in which determination is affirmative at step 116. Processing returns to the beginning in cases in which determination is negative at step 116.

At step 118, information is acquired regarding the speed of the vehicle 122 as computed from a signal output from the vehicle speed sensor 92. In cases in which the speed of the vehicle 122 is computed by the vehicle ECU 90, the microcomputer 58 acquires information regarding the speed of the vehicle 122 from the vehicle ECU 90.

Figure 13A:
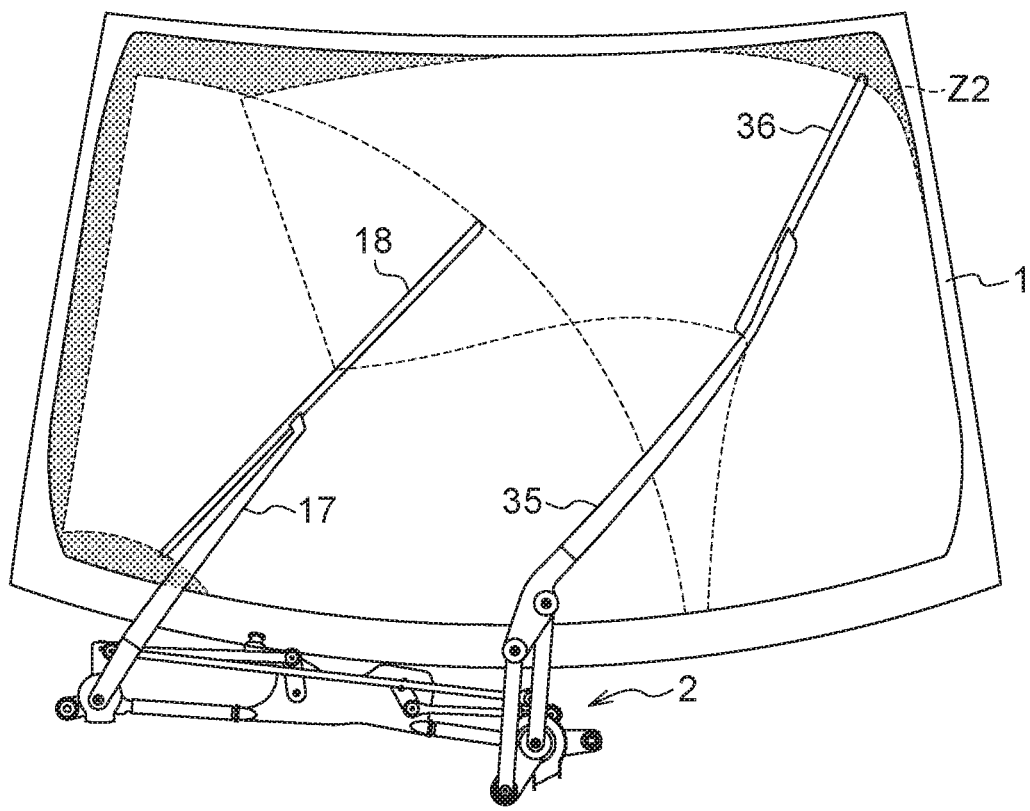
FIG. 13A is a schematic view illustrating an example of a change to a wiping range.
Figure 13B:
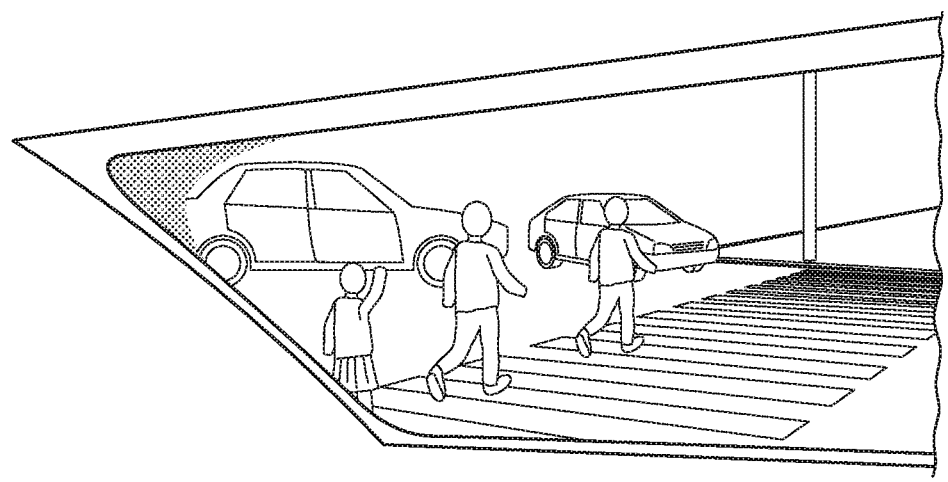
FIG. 13B is a schematic view illustrating a driver's field of view over a broad range secured by changing a wiping range.

At step 120, determination is made as to whether or not the speed of the vehicle 122 is a threshold speed or greater. The threshold speed is, for example, a speed of the vehicle 122 when the vehicle 122 is traveling slowly. In cases in which determination is affirmative at step 120, at step 122, as illustrated in FIG. 13A, the operating range of the front passenger seat side wiper arm 35 is changed such that the front passenger seat side wiper blade 36 wipes the wiping range Z2. In order to prevent the operation of the wiper device 2 from causing a distraction to vehicle occupants by continually wiping the wiping range Z2 while, for example, waiting at traffic signals at the crossroad 120, the wiping range Z2 is wiped only when the speed of the vehicle 122 is the threshold speed or greater. Changing the wiping range at step 122 secures a wide range for the field of view of the driver, as illustrated in FIG. 13B.

At step 122, the wiping range Z2 is wiped as the front passenger seat side wiper blade 36 moves on the outward path from the lower return position P2P toward the upper return position P1P. After wiping the wiping range Z2, the front passenger seat side wiper blade 36 performs normal operation so as to wipe the wiping range Z1 illustrated in FIG. 1 while moving on the return path from the upper return position P1P toward the lower return position P2P. This thereby enables the windshield glass 1 to be wiped over a broad region. Note that the wiping range Z2 may be wiped on the return path after wiping the wiping range Z1 on the outward path. Alternatively, the wiping range Z2 may be wiped on both the outward path and the return path.

At step 122, the changed wiping range is wiped on the outward path a predetermined number of times (at least once), after which processing returns to the beginning. The predetermined number of times is a sufficient number of times to secure the field of view to the front left of the driver when turning left at the crossroad 120. The specific value of the predetermined number of times varies according to the vehicle model and vehicle specifications, and is set on a case-by-case basis according to the vehicle model and vehicle specifications.

At step 122, the change to the wiping range may be abandoned and processing may return to the beginning in cases in which the left direction indicator is switched off, and at least one condition is met out of: the current position of the vehicle computed by the GPS device being no less than the predetermined distance D from the center 124 of the crossroad 120; or the steering angle of the vehicle 122 being below the threshold value.

Note that in cases in which determination is negative at step 120, normal operation is performed so as to wipe the wiping range Z1 illustrated in FIG. 1 at step 124, after which processing returns to the beginning.

As described above, in the present exemplary embodiment, the left-turn wiping processing illustrated in FIG. 12 enables changing of the wiping range of the front passenger seat side wiper blade 36 in a situation requiring a change to the wiping range of the front passenger seat side wiper blade 36 when turning left. The wiping range of the front passenger seat side wiper blade 36 is not changed when the vehicle 122 is traveling straight ahead, thus achieving the advantageous effect of suppressing the operation of the wiper device 2 from distracting occupants of the vehicle 122.

Moreover, when turning left, a broader field of view is secured for the driver by changing the wiping range of the front passenger seat side wiper blade 36, such that the driver is able to turn the vehicle 122 left with greater confidence at the crossroad 120.

Note that the present exemplary embodiment describes an example of a right-hand drive vehicle. Therefore, control to change the wiping range of the front passenger seat side wiper blade 36 is performed when turning left. In a left-hand drive vehicle, it would become necessary to secure the field of view on the front passenger seat side when turning right. In a left-hand drive vehicle, this can be achieved by substituting "left turn" with "right turn", and substituting "the direction indicator switch 54 has been switched ON to indicate a left turn" with "the direction indicator switch 54 has been switched ON to indicate a right turn" in the processing illustrated in FIG. 12.

Whether a right-hand drive vehicle or a left-hand drive vehicle, performing control to change the wiping range of the front passenger seat side wiper blade 36 when the vehicle turns toward the front passenger seat side secures a broader field of view for the driver.

In the present exemplary embodiment, as illustrated in FIG. 12, the wiping range is changed in cases in which the direction indicator has been switched ON to indicate a left turn, the vehicle 122 is within the predetermined distance D of the center 124 of the crossroad 120, and the speed of the vehicle 122 is the threshold speed or greater. Moreover, in the present exemplary embodiment, the wiping range is changed in cases in which the direction indicator has been switched ON to indicate a left turn, the steering angle of the vehicle 122 is the threshold value or greater, and the speed of the vehicle 122 is the threshold speed or greater. Namely, in the present exemplary embodiment, AND control is executed to change the wiping range in cases in which plural conditions have been met.

However, depending on the situation, OR control may be executed in order to start changing the wiping range of the front passenger seat side wiper blade 36 more swiftly. For example, the wiping range of the front passenger seat side wiper blade 36 may be changed by determining a state in which a broad field of view should be secured on the front passenger seat side (a state in which the vehicle orientation shifts toward the front passenger seat side, in other words a state in which the gaze of the driver shifts toward the front passenger seat side) when at least one case is met out of: a case in which the direction indicator has been switched ON to indicate a left turn; a case in which the vehicle 122 is within the predetermined distance D from the center 124 of the crossroad 120; or a case in which the steering angle of the vehicle 122 is the threshold value or greater.

Alternatively, the wiping range of the front passenger seat side wiper blade 36 may be changed by determining a situation in which a broad field of view toward the front should be secured on the front passenger seat side in cases in which the speed of the vehicle 122 is the threshold speed or greater, and when at least one case is also met out of: a case in which the direction indicator has been switched ON to indicate a left turn; a case in which the vehicle 122 is within the predetermined distance D of the center 124 of the crossroad 120; or a case in which the steering angle of the vehicle 122 is the threshold value or greater.

Note that configuration may be made in which a route is set by a car navigation system that sets a route to a predetermined destination using the current position computed by the GPS device and map information. In such cases, a state in which a broad field of view should be secured on the front passenger seat side may be determined in a case in which a left turn instruction has been issued by the car navigation system when within the predetermined distance D from the center 124 of the crossroad 120. Such a configuration can prevent the wiping range from being changed when traveling straight ahead over the crossroad 120. Note that as described above, the present exemplary embodiment describes an example of application to a right-hand drive vehicle. Namely, the "left turn instruction" referred to here is an instruction to turn toward the front passenger seat side in a right-hand drive vehicle. Accordingly, in the case of a left-hand drive vehicle, the "left turn instruction" becomes a "right turn instruction".

Moreover, configuration may be made in which a state in which a broad field of view should be secured on the front passenger seat side is determined in cases in which a left turn instruction has been given by a car navigation system.

The wiping range of the front passenger seat side wiper blade 36 may be changed when the onboard camera 94 or a radar (not illustrated in the drawings) has detected the presence of a pedestrian on the front passenger seat side or has detected the presence of an obstacle on the front passenger seat side. For example, the wiping range of the front passenger seat side wiper blade 36 may be changed when the direction indicator has been switched ON to indicate a left turn and the onboard camera 94 or a radar has detected the presence of a pedestrian or obstacle on the front passenger seat side. Accordingly, even when the vehicle turns left, the wiping range of the front passenger seat side wiper blade 36 is not changed if there is no pedestrian or obstacle present on the front passenger seat side, thereby suppressing the operation of the wiper device 2 from distracting occupants of the vehicle 122.

Moreover, providing the rain sensor 76 and the onboard camera 94 on the vehicle cabin inside of the windshield glass 1 at the top of the windshield glass 1 on the front passenger seat side, such that the rain sensor 76 and the onboard camera 94 are capable of acquiring information regarding at least a portion of the non-wiped region X illustrated in FIG. 20, enables the wiping range to be changed when the non-wiped region X has become dirty (when a change in the wiping range is required). This enables distraction caused by operation of the wiper device 2 to be reduced.

Note that configuration may be made in which a receiver (not illustrated in the drawings) is provided to detect the position of a communication device such as a mobile telephone in the possession of a pedestrian or the like. The wiping range of the front passenger seat side wiper blade 36 may be changed when the presence of a pedestrian or the like is detected on the front passenger seat side. For example, the wiping range of the front passenger seat side wiper blade 36 may be changed in cases in which the direction indicator has been switched ON to indicate a left turn, and the presence of a pedestrian on the front passenger seat side has been detected by the receiver. Accordingly, the wiping range of the front passenger seat side wiper blade 36 is not changed in cases in which there is no pedestrian present on the front passenger seat side even when the vehicle 122 is turning left, thereby suppressing the operation of the wiper device 2 from distracting occupants of the vehicle 122.

In the present exemplary embodiment, the driver may be capable of appropriately changing the control mode of the left-turn wiping processing, for example between the AND control or the OR control described above. Changing the control mode enables the left-turn wiping processing to be adapted for the situation or to the preferences of the driver.

Second Exemplary Embodiment

Next, explanation follows regarding a second exemplary embodiment of the present disclosure. The configuration of the wiper system according to the present exemplary embodiment is the same as that of the wiper system 100 according to the first exemplary embodiment illustrated in FIG. 1 to FIG. 9, and detailed explanation thereof is therefore omitted.

In the present exemplary embodiment, a left-hand curve in the road is detected by image processing performed on image data captured by the onboard camera 94 provided at the vehicle cabin inside of the windshield glass 1, specifically on the reverse side of the room mirror, at the top on the front passenger seat side, or the like. The wiping range of the front passenger seat side wiper blade 36 is changed when entry of the vehicle to a left-hand curve is determined to be a situation in which the field of view toward the front on the front passenger seat side should be secured.

Figure 14A:
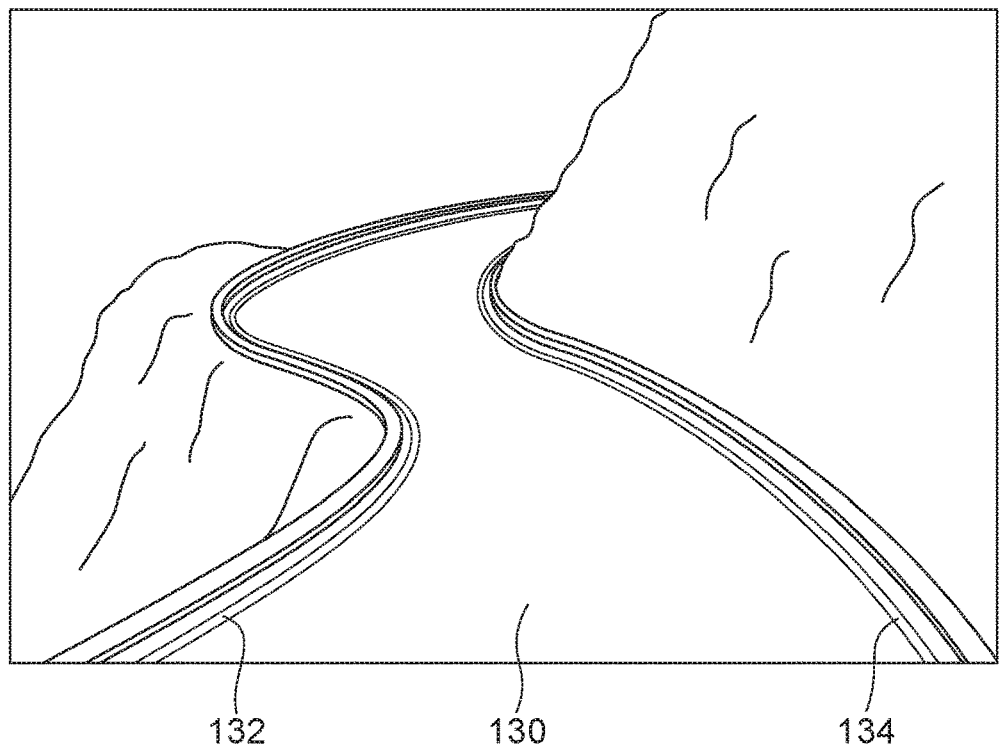
FIG. 14A is an example of an image looking ahead of a vehicle, imaged by an onboard camera in a vehicle wiper device according to a second exemplary embodiment of the present disclosure.

FIG. 14A illustrates an example of an image ahead of the vehicle captured by the onboard camera 94. In FIG. 14A, a road 130 has consecutive left-hand curves and right-hand curves, being what is referred to as a winding road. A left-hand white line 132 marks the left boundary of the road 130 at the left side of the road 130, and a right-hand white line 134 marks the right boundary of the road 130 at the right side of the road 130.

Figure 14B:
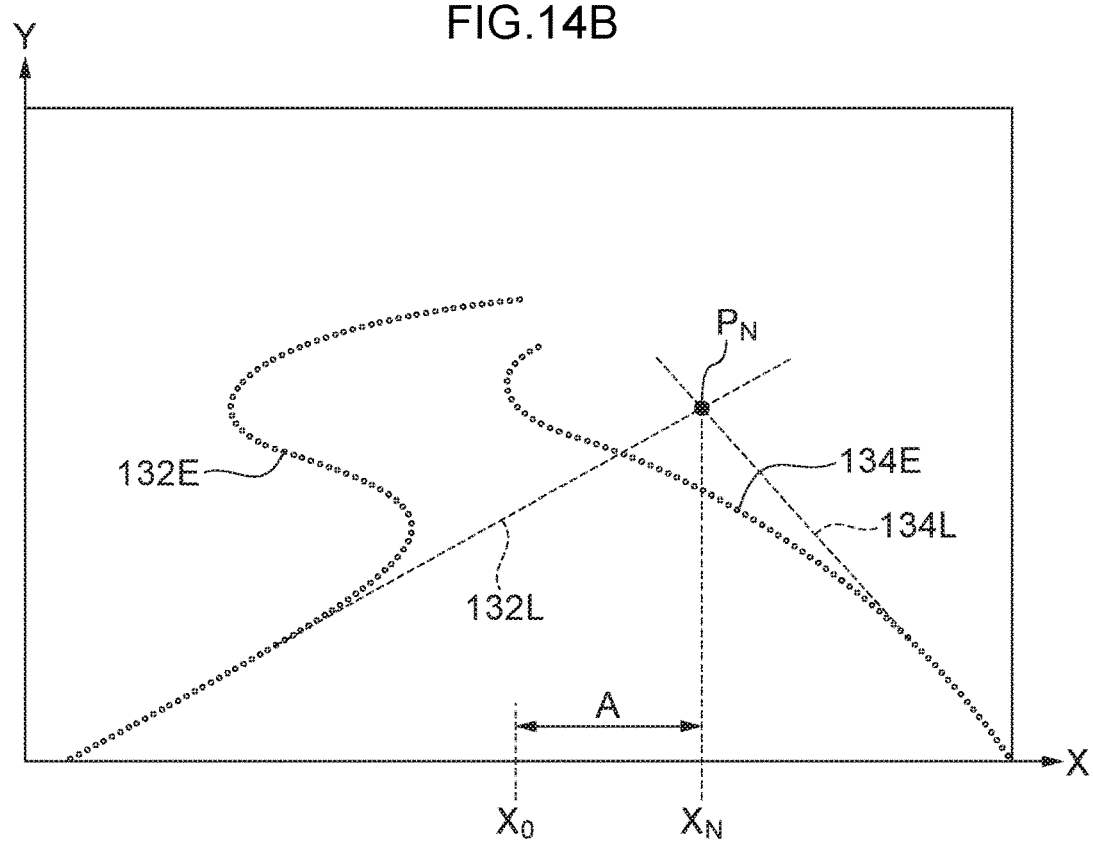
FIG. 14B is a schematic view illustrating an example of a state in which white lines on a road have been extracted from the image illustrated in FIG. 14A.

In the present exemplary embodiment, the image data illustrated in FIG. 14A is processed employing a known image processing method such as a Canny method, a differential edge detection method, or a Sobel method in order to extract edges corresponding to the left-hand white line 132 and the right-hand white line 134 from the image data. A lateral direction position of each pixel in the image data is defined by an X coordinate, and a vertical direction position of each pixel in the image data is defined by a Y coordinate. For example, as illustrated by the left-hand white line edge 132E and the right-hand white line edge 134E illustrated in FIG. 14B, this image processing extracts consecutive points as edges corresponding to the left-hand white line 132 and the right-hand white line 134.

Next, in the present exemplary embodiment, linear approximation processing is performed. In the linear approximation processing, the extracted left-hand white line edge 132E and right-hand white line edge 134E are approximated to straight lines by Hough conversion, to derive the approximated straight lines 132L, 134L running along estimated white lines.

An X coordinate value ($X_N$) of an intersection $P_N$ of the derived approximated straight lines 132L, 134L is then derived, and a horizontal direction displacement amount A between the derived X coordinate value ($X_N$) of the intersection $P_N$ and an X coordinate value ($X_O$) of the center of the image data is derived ($A = X_N - X_O$). The X values of the X coordinates increase on progression toward from left to right in FIG. 14B, such that in FIG. 14B $X_O < X_N$, and A is a positive value. A specific threshold value is set using actual road testing and the like, and anticipates curves with tight curvature to be cases in which it would be important for the field of view toward the front on the front passenger seat side to be secured for the driver.

In cases in which the computed displacement amount A is a predetermined threshold value or greater, the vehicle 122 is determined to be coming into a left-hand curve, and rotation of the first motor 11 and the second motor 12 is controlled such that the front passenger seat side wiper blade 36 wipes the wiping range Z2 illustrated in FIG. 1 and FIG. 13A.

As described above, in the present exemplary embodiment, the wiping range of the front passenger seat side wiper blade 36 is changed in a situation requiring a change in the wiping range, such as when traveling through a left-hand curve, thereby enabling a broader field of view to be secured for the driver.

The wiping range may be changed in cases in which the speed of the vehicle 122 is a threshold speed or greater, similarly to in the first exemplary embodiment. This is since the wiping range does not necessarily need to be changed when the vehicle 122 is traveling slowly.

FIG. 15 is a flowchart illustrating an example of left-turn wiping processing to detect a left-hand curve (front passenger seat side curve) ahead of the vehicle 122 and change the wiping range on the front passenger seat side of the windshield glass 1 in the wiper system 100 according to the present exemplary embodiment. The sequence illustrated in FIG. 15 is processed by the microcomputer 58 inside the control circuit 52.

At step 140, image data captured by the onboard camera 94 is acquired, and at step 142, the image data is processed using a known image processing method such as a Canny method, a differential edge detection method, or a Sobel method to extract edges corresponding to the left-hand white line 132 and the right-hand white line 134 from the image data.

At step 144, XY coordinates are set in the image data from which edges have been extracted, and at step 146, linear approximation is performed on the extracted left-hand white line edge 132E and the right-hand white line edge 134E by Hough conversion to compute the approximated straight lines 132L, 134L that run along estimated white lines.

At step 148, the X coordinate value ($X_N$) of the intersection $P_N$ of the approximated straight lines 132L, 134L is computed, and the horizontal direction displacement amount A between the X coordinate value ($X_N$) of the intersection $P_N$ and the X coordinate value ($X_O$) of the center of the image data is computed ($A=X_N-X_O$).

At step 150, determination is made as to whether or not the displacement amount A is a threshold value or greater. In cases in which determination is affirmative at step 150, at step 152 the operating range of the front passenger seat side wiper arm 35 is changed as illustrated in FIG. 13A such that the front passenger seat side wiper blade 36 wipes the wiping range Z2.

At step 152, the wiping range Z2 is wiped as the front passenger seat side wiper blade 36 moves on the outward path from the lower return position P2P toward the upper return position P1P. After wiping the wiping range Z2, the front passenger seat side wiper blade 36 performs normal operation so as to wipe the wiping range Z1 illustrated in FIG. 1 while moving on the return path from the upper return position P1P toward the lower return position P2P. This thereby enables the windshield glass 1 to be wiped over a broad region. Note that the wiping range Z1 may be wiped on the outward path, and the wiping range Z2 may be wiped on the return path. The wiping range Z2 may also be wiped on both the outward path and the return path.

At step 152, the changed wiping range is wiped on the outward path a predetermined number of times (at least once), after which processing returns to the beginning. The predetermined number of times is a sufficient number of times for the field of view at the front left to be secured for the driver when traveling through a left-hand curve. The specific value of the predetermined number of times varies according to the vehicle model and vehicle specifications, and is set on a case-by-case basis according to the vehicle model and vehicle specifications.

In cases in which determination is negative at step 150, at step 154 the normal operation is performed so as to wipe the wiping range Z1 illustrated in FIG. 1, and processing returns to the beginning.

The control described in the present exemplary embodiment for detecting a left-hand curve by performing image processing on the image data acquired by the onboard camera 94 may be combined with the control described in the first exemplary embodiment to determine whether or not the vehicle 122 is turning left at a crossroad 120. Combining the present exemplary embodiment and the first exemplary embodiment enables control to change the wiping range to be performed in response to both a crossroad 120 and a left-hand curve in the road 130.

As a modified example of the present exemplary embodiment, an in-cabin camera (not illustrated in the drawings) that captures the face of the driver in the vehicle cabin of the vehicle 122 may be provided separately to the onboard camera 94. At least one out of the direction of the face of the driver or the direction of the gaze of the driver may be detected by using a known method such as those described above to detect edges of the face of the driver in image data acquired by the in-cabin camera, and the wiping range of the front passenger seat side wiper blade 36 may be changed when the direction of the face of the driver or the direction of the gaze of the driver is directed toward the front left (front passenger seat side) of the vehicle 122.

By determining whether or not a change in the wiping range of the front passenger seat side wiper blade 36 is required based on at least one out of the direction of the face of the driver or the direction of the gaze of the driver enables the wiping range to be changed effectively in response to the situation.

Note that the present exemplary embodiment describes an example of a right-hand drive vehicle. Therefore, control to change the wiping range of the front passenger seat side wiper blade 36 is performed when traveling through a left-hand curve. In a left-hand drive vehicle, it is necessary to secure the field of view on the front passenger seat side when traveling through a right-hand curve. In a left-hand drive vehicle, this can be achieved by substituting "left-hand curve" with "right-hand curve", and substituting "cases in which the computed displacement amount A exceeds a predetermined threshold value" with "cases in which the computed displacement amount A is a negative value, and the absolute value of the computed displacement amount A exceeds a predetermined threshold value" in the above processing.

Whether a right-hand drive vehicle or a left-hand drive vehicle, performing control to change the wiping range of the front passenger seat side wiper blade 36 when the vehicle turns toward the front passenger seat side secures a broader field of view for the driver.

Third Exemplary Embodiment

Figure 16:
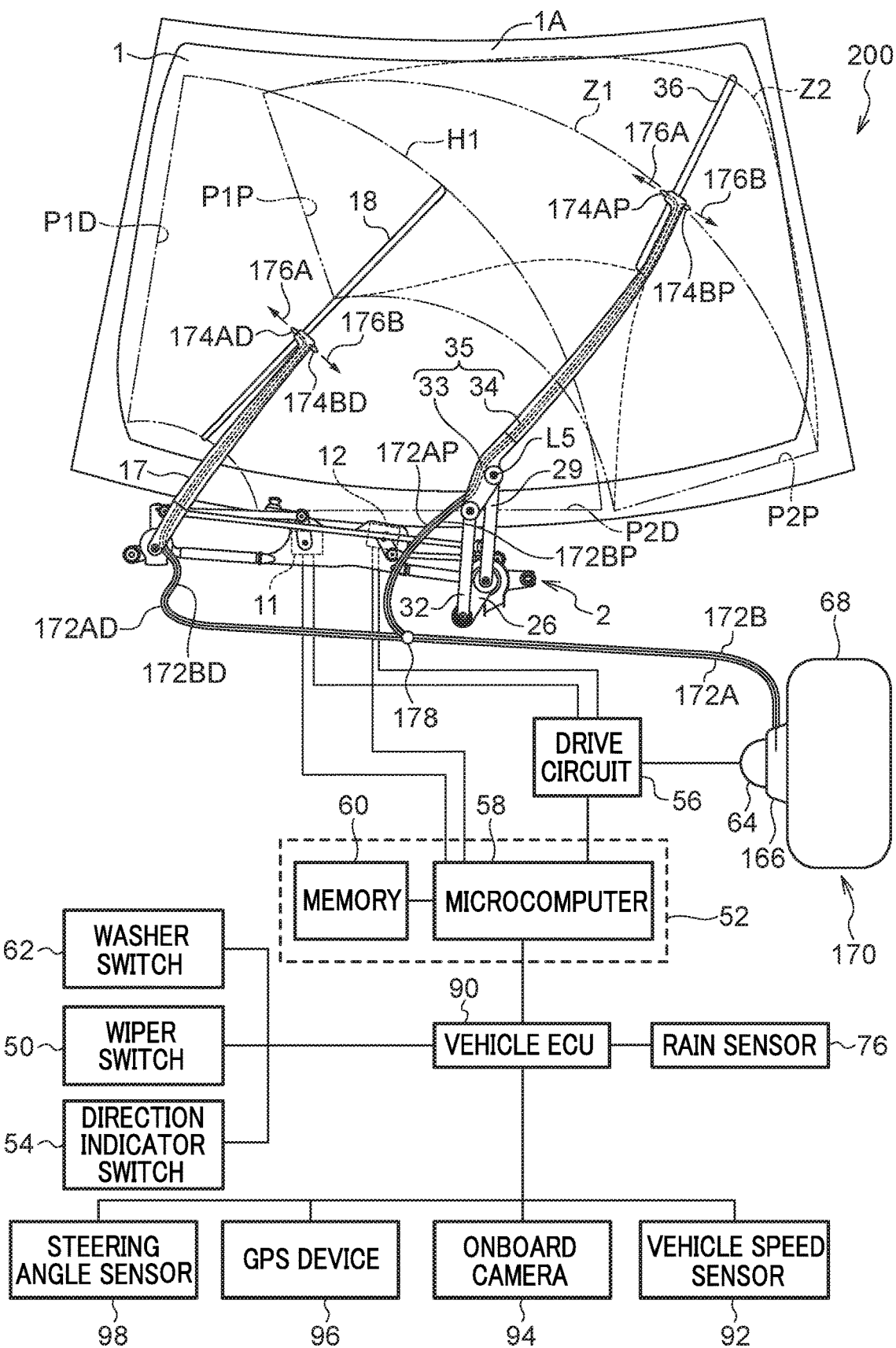
FIG. 16 is a schematic view illustrating an example of a configuration of a wiper system according to a third exemplary embodiment of the present disclosure.

Next, explanation follows regarding a third exemplary embodiment of the present disclosure. FIG. 16 is a schematic diagram illustrating an example of a configuration of a wiper system 200 according to the present exemplary embodiment. The present exemplary embodiment differs from the first exemplary embodiment with regard to nozzles, a hose to convey washer liquid under pressure, and a washer pump 166 that conveys washer liquid under pressure in a washer device 170. Other configurations are the same as those of the first exemplary embodiment, and therefore detailed explanation of configurations other than the nozzles, hose, and washer pump 166 is omitted.

In the present exemplary embodiment, a driver's seat side outward path nozzle 174AD is provided to the leading end portion of the driver's seat side wiper arm 17 on the side facing the upper return position P1D (outward path side of the driver's seat side wiper arm 17), and a driver's seat side return path nozzle 174BD is provided to the leading end portion of the driver's seat side wiper arm 17 on the side facing the lower return position P2D (return path side of the driver's seat side wiper arm 17).

Moreover, in the present exemplary embodiment, a front passenger seat side outward path nozzle 174AP is provided to the leading end portion of the front passenger seat side wiper arm 35 on the side facing the upper return position P1P (outward path side of the front passenger seat side wiper arm 35), and a front passenger seat side return path nozzle 174BP is provided to the leading end portion of the front passenger seat side wiper arm 35 on the side facing the lower return position P2P (return path side of the front passenger seat side wiper arm 35).

The driver's seat side outward path nozzle 174AD and the front passenger seat side outward path nozzle 174AP spray washer liquid in an outward path spray direction 176A as the driver's seat side wiper blade 18 and the front passenger seat side wiper blade 36 wipe their respective outward paths from the lower return positions P2D, P2P toward the upper return positions P1D, P1P.

The driver's seat side return path nozzle 174BD and the front passenger seat side return path nozzle 174BP spray washer liquid in a return path spray direction 176B as the driver's seat side wiper blade 18 and the front passenger seat side wiper blade 36 wipe their respective return paths from the upper return positions P1D, P1P toward the lower return positions P2D, P2P.

The washer pump 166 conveys washer liquid from the washer liquid tank 68 to an outward path spray hose 172A when on the outward path, and to a return path spray hose 172B when on the return path. The outward path spray hose 172A branches into a driver's seat side outward path spray hose 172AD and a front passenger seat side outward path spray hose 172AP at a branch 178, illustrated in FIG. 16. The return path spray hose 172B branches into a driver's seat side return path spray hose 172BD and a front passenger seat side return path spray hose 172BP at the branch 178, illustrated in FIG. 16.

The driver's seat side outward path spray hose 172AD and the driver's seat side return path spray hose 172BD run inside the driver's seat side wiper arm 17, as illustrated in FIG. 16. The front passenger seat side outward path spray hose 172AP and the front passenger seat side return path spray hose 172BP run inside the front passenger seat side wiper arm 35, as illustrated in FIG. 16.

The driver's seat side outward path spray hose 172AD is connected to the driver's seat side outward path nozzle 174AD, the driver's seat side return path spray hose 172BD is connected to the driver's seat side return path nozzle 174BD, the front passenger seat side outward path spray hose 172AP is connected to the front passenger seat side outward path nozzle 174AP, and the front passenger seat side return path spray hose 172BP is connected to the front passenger seat side return path nozzle 174BP.

The driver's seat side outward path spray hose 172AD, the driver's seat side return path spray hose 172BD, the front passenger seat side outward path spray hose 172AP, and the front passenger seat side return path spray hose 172BP are preferably laid out with appropriate and sufficient lengths, so as to avoid kinking and pulling stress acting accompanying operation of the driver's seat side wiper arm 17 and the front passenger seat side wiper arm 35. In particular, in the present exemplary embodiment, the front passenger seat side wiper arm 35 moves upward when the wiping range is changed. The lengths of the front passenger seat side outward path spray hose 172AP and the front passenger seat side return path spray hose 172BP are thus preferably set such that this movement is not accompanied by excessive stress.

The material employed for the outward path spray hose 172A, the return path spray hose 172B, the driver's seat side outward path spray hose 172AD, the driver's seat side return path spray hose 172BD, the front passenger seat side outward path spray hose 172AP, and the front passenger seat side return path spray hose 172BP is preferably material that is tough with respect to kinking and pulling while also being flexible, such as a synthetic rubber or synthetic resin.

The washer motor 64 rotates in opposite directions on the outward path and the return path, thereby driving the washer pump 166 such that washer liquid is sprayed from the driver's seat side outward path nozzle 174AD and the front passenger seat side outward path nozzle 174AP on the outward path, and from the driver's seat side return path nozzle 174BD and the front passenger seat side return path nozzle 174BP on the return path.

FIG. 17 is a cross-section illustrating an example of the washer pump 166 according to the present exemplary embodiment. The washer pump 166 according to the present exemplary embodiment is a type of turbo pump including a turbine 166A driven by the washer motor 64. The turbine 166A is driven in the direction of the outward path arrow on the outward path, and in the direction of the return path arrow on the return path.

When the turbine 166A is driven, washer liquid in the washer liquid tank 68 is drawn into a pump housing 166B through an intake port 166C. The washer liquid is discharged from the pump housing 166B through an outward path discharge port 166D when the turbine 166A is driven in the direction of the outward path arrow, and the washer liquid is discharged through a return path discharge port 166E when the turbine 166A is driven in the direction of the return path arrow. The outward path discharge port 166D is connected to the driver's seat side outward path nozzle 174AD and the front passenger seat side outward path nozzle 174AP through the outward path spray hose 172A and the like, and the return path discharge port 166E is connected to the driver's seat side return path nozzle 174BD and the front passenger seat side return path nozzle 174BP through the return path spray hose 172B and the like. Accordingly, the washer liquid is sprayed from the driver's seat side outward path nozzle 174AD and the front passenger seat side outward path nozzle 174AP when the turbine 166A is driven in the direction of the outward path arrow, and the washer liquid is sprayed from the driver's seat side return path nozzle 174BD and the front passenger seat side return path nozzle 174BP when the turbine 166A is driven in the direction of the return path arrow.

As illustrated in FIG. 17, the washer pump 166 according to the present exemplary embodiment includes a valve 166F configured by an elastic body such as rubber or a synthetic resin. The valve 166F flexes under the pressure of the washer liquid conveyed under pressure by the turbine 166A so as to block either an outward path washer liquid inlet 166G or a return path washer liquid inlet 166H.

For example, when the turbine 166A is driven in the direction of the outward path arrow, pressure on the outward path washer liquid inlet 166G side rises such that the valve 166F flexes toward the return path washer liquid inlet 166H, blocking the return path washer liquid inlet 166H. When the turbine 166A is driven in the direction of the return path arrow, pressure on the return path washer liquid inlet 166H side rises such that the valve 166F flexes toward the outward path washer liquid inlet 166G, blocking the outward path washer liquid inlet 166G As a result, the washer liquid is sprayed selectively from either the outward path spray nozzles 174A or the return path spray nozzles 174B depending on whether the turbine 166A is being driven in a forward rotation direction or a backward rotation direction.

The configuration of the drive circuit 56 of the washer motor 64 that drives the washer pump 166 is the same as that of the first exemplary embodiment, illustrated in FIG. 9. In the present exemplary embodiment, the drive circuit 56 operates in the following manner to rotate the washer motor 64 forward and rotate the washer motor 64 backward. Note that in the present exemplary embodiment, the washer motor 64 rotates forward when on the outward path, and rotates backward when on the return path.

When rotating the washer motor 64 forward, the relay drive circuit 78 switches the relay RLY1 ON (the relay RLY2 is OFF), and the FET drive circuit 80 switches the FET 86B ON at a predetermined duty ratio. When rotating the washer motor 64 backward, the relay drive circuit 78 switches the relay RLY2 ON (the relay RLY1 is OFF), and the FET drive circuit 80 switches the FET 86B ON at a predetermined duty ratio.

Note that in the configuration of the present exemplary embodiment includes a single washer motor and a single washer pump, similarly to the first exemplary embodiment. However, a dedicated washer motor and a dedicated washer pump may be provided separately for the outward path and the return path.

Figure 18A:
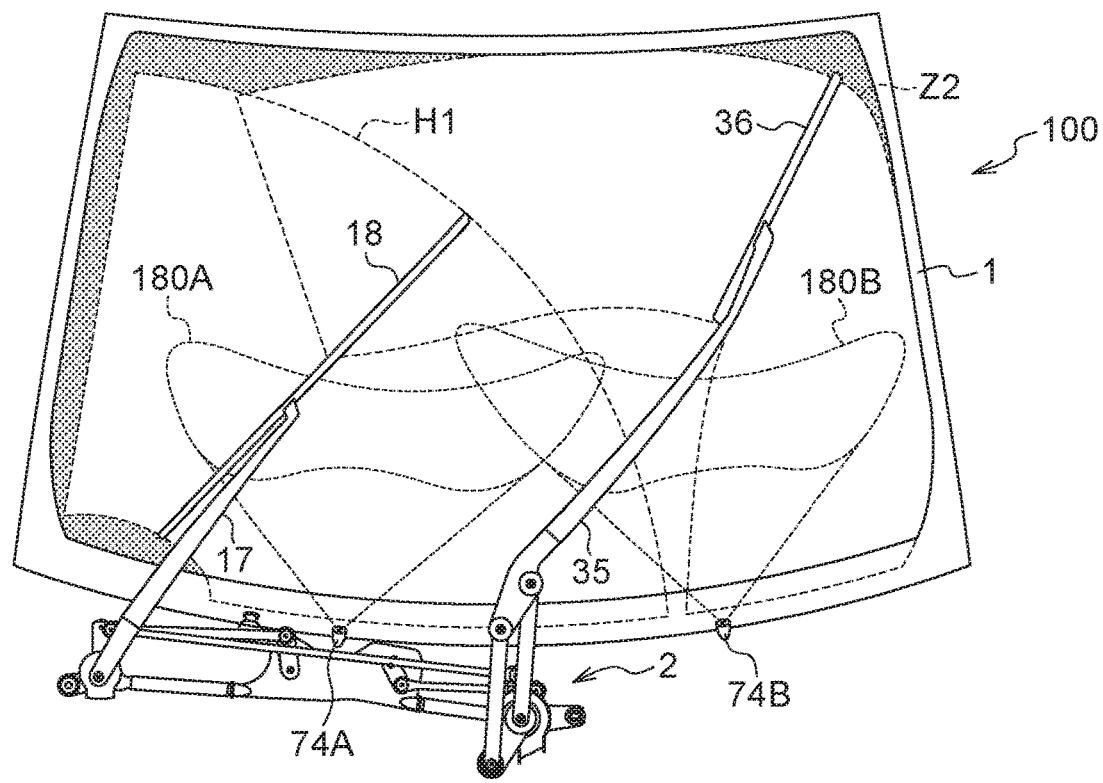
FIG. 18A is a schematic view illustrating an example of washer liquid landing on a windshield glass in the first exemplary embodiment of the present disclosure.

Next, explanation follows regarding operation of the present exemplary embodiment. In the wiper system 100 of the first exemplary embodiment in which the washer liquid nozzles are provided below the windshield glass 1, as illustrated in FIG. 18A, washer liquid sprayed from the driver's seat side nozzle 74A lands in a landing region 180A, for example. Washer liquid sprayed from the front passenger seat side nozzle 74B lands in a landing region 180B, for example.

The landing regions 180A, 180B are both partial areas of the windshield glass 1. Accordingly, the washer liquid cannot be made to land over the entirety of the wiping range H1 and wiping range Z2.

Figure 18B:
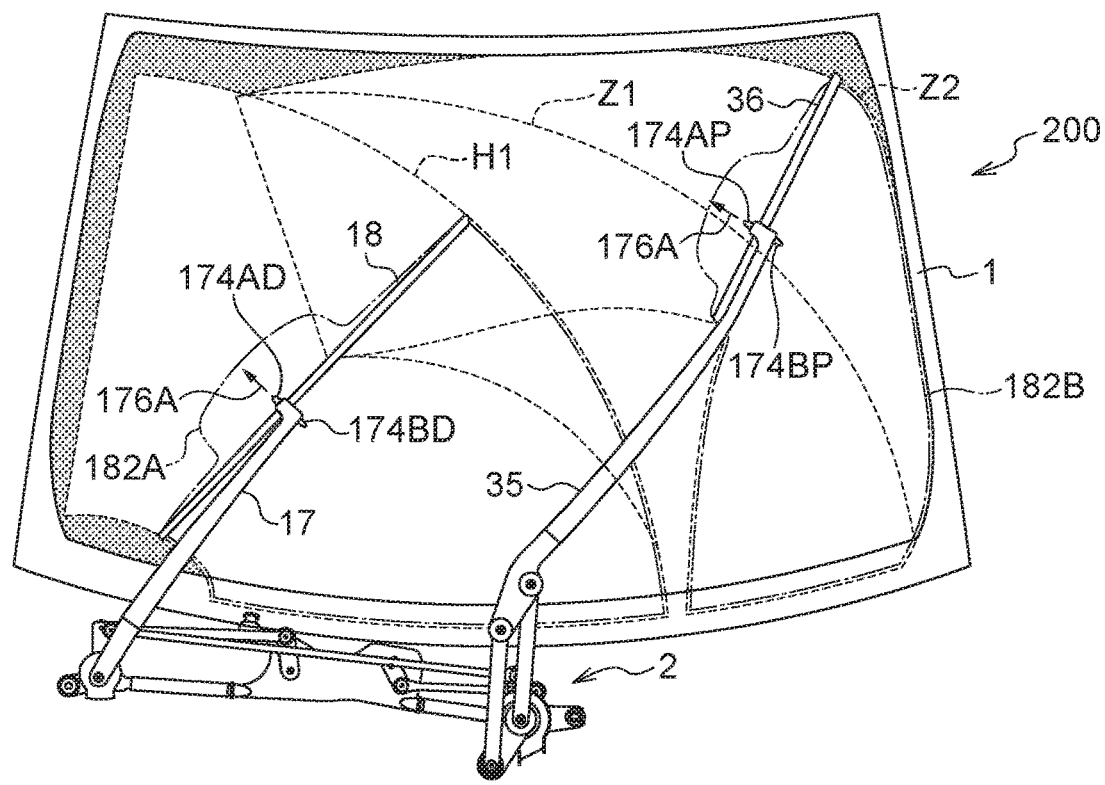
FIG. 18B is a schematic view illustrating an example of washer liquid landing when on an outward path in a wiper system according to the third exemplary embodiment of the present disclosure.
Figure 19A:
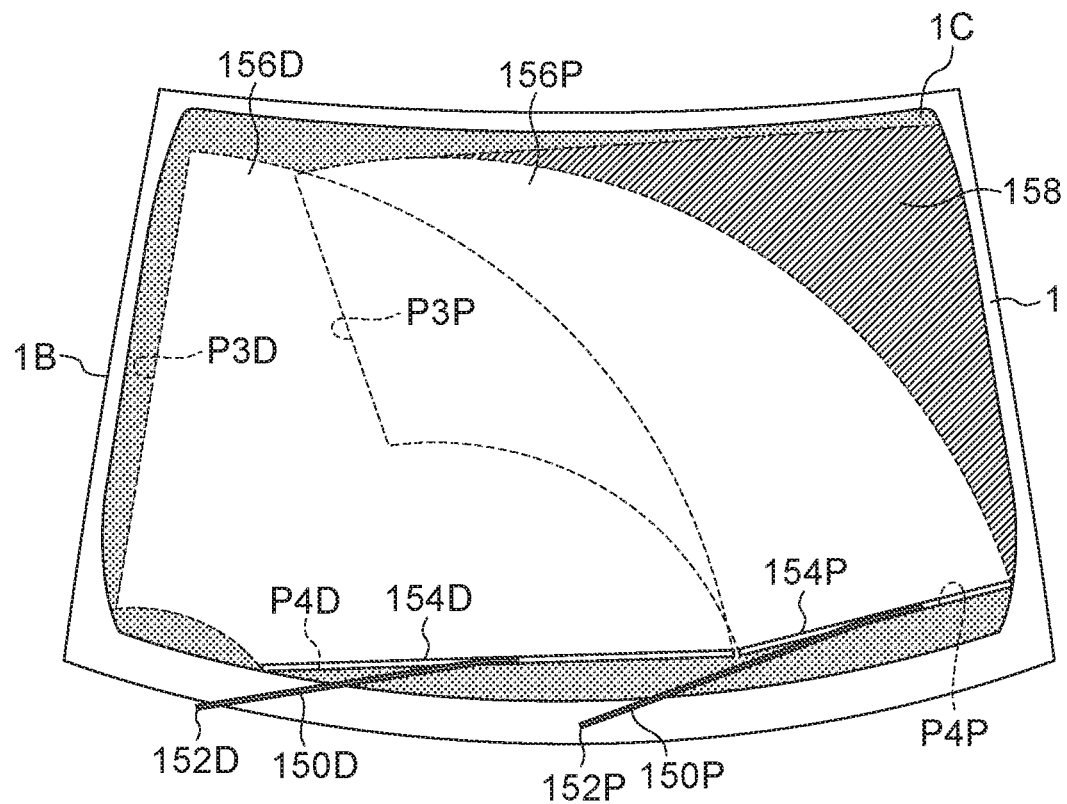
FIG. 19A is a schematic view illustrating an example of a wiper device in which a wiping range is not changed.
Figure 19B:
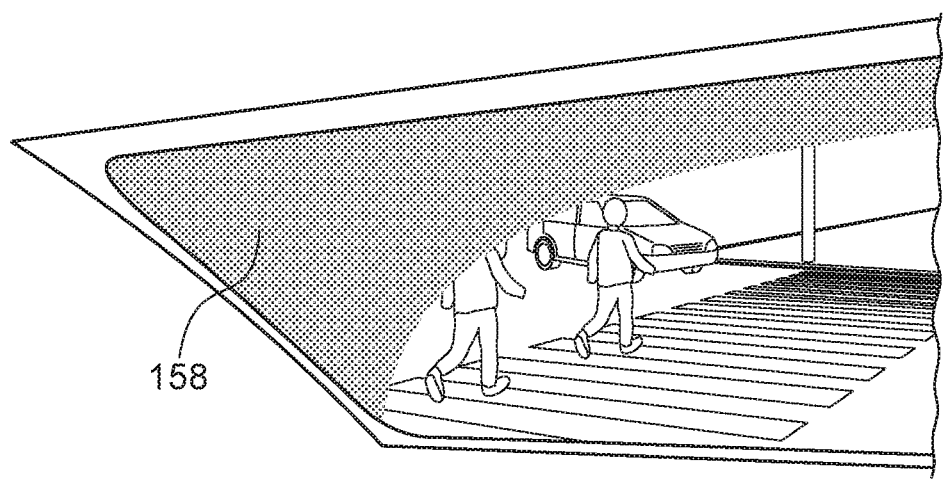
FIG. 19B is a schematic view illustrating a limited field of view of a driver resulting from not changing a wiping range.

FIG. 18B is a schematic diagram illustrating an example in which washer liquid is sprayed on the outward path in the wiper system 200 according to the present exemplary embodiment. In FIG. 18B, the washer liquid is sprayed in the outward path spray direction 176A from both the driver's seat side outward path nozzle 174AD and the front passenger seat side outward path nozzle 174AP. The sprayed washer liquid is spread over landing regions 182A, 182B by the driver's seat side wiper blade 18 and the front passenger seat side wiper blade 36 as they move on the outward path.

When the driver's seat side wiper blade 18 reaches the upper return position P1D as the washer liquid is being sprayed from the driver's seat side outward path nozzle 174AD, the landing region 182A extends over the entire wiping range H1. Moreover, when the front passenger seat side wiper blade 36 reaches the upper return position P1P as the washer liquid is being sprayed from the front passenger seat side outward path nozzle 174AP, the landing region 182B extends over the entire wiping range Z2.

On the return path, the driver's seat side wiper blade 18 wipes the wiping range H1 while washer liquid is being sprayed from the driver's seat side return path nozzle 174BD, and the front passenger seat side wiper blade 36 wipes the wiping range Z1 while washer liquid is being sprayed from the front passenger seat side return path nozzle 174BP.

As a result, washer liquid can be made to land in the wiping ranges H1, Z1, and Z2 during movement on the outward path and movement on the return path as described above, thereby enabling a broad region corresponding to substantially the entire surface of the windshield glass 1 to be washed by the washer liquid.

Moreover, in order to wash the windshield glass 1 more effectively, when the driver's seat side wiper blade 18 has reached the upper return position P1D and the front passenger seat side wiper blade 36 has reached the upper return position P1P, the respective wiper blades may pause their wiping actions for a predetermined time and spray washer liquid from both the driver's seat side return path nozzle 174BD and the front passenger seat side return path nozzle 174BP.

Moreover, when the front passenger seat side wiper arm 35 is at its maximum extension toward the upper corner on the front passenger seat side of the windshield glass 1 on the outward path, the front passenger seat side wiper arm 35 may pause its wiping action for a predetermined time and spray washer liquid from the front passenger seat side outward path nozzle 174AP in order to wash the windshield glass 1 more effectively.

In the present exemplary embodiment, the outward and return operation performed while spraying washer liquid is executed when the washer switch 62 has been operated. However, this operation may be executed automatically in cases in which rain, dirt, snow, ice, or the like has been detected on the windshield glass 1 by the rain sensor 76 provided on the vehicle cabin inside of the windshield glass 1, specifically on the reverse side of the room mirror or at the top on the front passenger seat side of the windshield glass 1. Alternatively, washer liquid may be sprayed when a situation in which the field of view toward the front on the front passenger seat side should be secured is determined to have arisen as in the first exemplary embodiment and the second exemplary embodiment described above.

As described above, in the present exemplary embodiment washer liquid spray nozzles for the outward path and the return path are provided at the leading end portions of the driver's seat side wiper arm 17 and the front passenger seat side wiper arm 35 of the wiper device 2 that is capable of changing a wiping range. On the outward path, washer liquid is sprayed from the outward path washer liquid spray nozzles, and the wiping range of the front passenger seat side wiper blade 36 is shifted upward on the front passenger seat side of the windshield glass 1, and on the return path, washer liquid is sprayed from the return path washer liquid spray nozzles and the windshield glass 1 is wiped without changing the wiping range of the front passenger seat side wiper blade 36, thereby enabling the washer liquid to be spread quickly over a broad region of the windshield glass 1.

Note that in the present exemplary embodiment, the driver's seat side outward path nozzle 174AD is provided to the leading end portion of the driver's seat side wiper arm 17 on the side facing the upper return position P1D (the outward path side of the driver's seat side wiper arm 17), and the driver's seat side return path nozzle 174BD is provided to the leading end portion of the driver's seat side wiper arm 17 on the side facing the lower return position P2D (the return path side of the driver's seat side wiper arm 17); however, there is no limitation thereto. For example, the driver's seat side outward path nozzle 174AD and the driver's seat side return path nozzle 174BD may be provided on a leading end side of the driver's seat side wiper arm 17 (on a leading end side of a length direction intermediate portion of the driver's seat side wiper arm 17). Alternatively, the driver's seat side outward path nozzle 174AD may be provided to the leading end portion of the driver's seat side wiper arm 17, and the driver's seat side return path nozzle 174BD may be provided on a leading end side of the driver's seat side wiper arm 17.

Moreover, in the present exemplary embodiment, the front passenger seat side outward path nozzle 174AP is provided to the leading end portion of the front passenger seat side wiper arm 35 on the side facing the upper return position P1P (the outward path side of the front passenger seat side wiper arm 35), and the front passenger seat side return path nozzle 174BP is provided to the leading end portion of the front passenger seat side wiper arm 35 on the side facing the lower return position P2P (the return path side of the front passenger seat side wiper arm 35); however, there is no limitation thereto. For example, the front passenger seat side outward path nozzle 174AP and the front passenger seat side return path nozzle 174BP may be provided on a leading end side of the front passenger seat side wiper arm 35 (on a leading end side of a length direction intermediate portion of the front passenger seat side wiper arm 35). Alternatively, the front passenger seat side outward path nozzle 174AP may be provided to the leading end portion of the front passenger seat side wiper arm 35, and the front passenger seat side return path nozzle 174BP may be provided on a leading end side of the front passenger seat side wiper arm 35.

Note that in the present exemplary embodiment, configuration is made in which cleaning liquid is sprayed from the nozzle on the side facing in the wiping direction of the front passenger seat side wiper blade 36 (either the front passenger seat side outward path nozzle 174AP or the front passenger seat side return path nozzle 174BP). However, cleaning liquid may be sprayed from both the front passenger seat side outward path nozzle 174AP and the front passenger seat side return path nozzle 174BP provided to the front passenger seat side wiper arm 35 on the outward path. Moreover, cleaning liquid may be sprayed from both the front passenger seat side outward path nozzle 174AP and the front passenger seat side return path nozzle 174BP provided to the front passenger seat side wiper arm 35 on the return path. So doing enables configuration of the washer pump to be simplified. Similarly, cleaning liquid may be sprayed from both the driver's seat side outward path nozzle 174AD and the driver's seat side return path nozzle 174BD on the outward path or on the return path of the driver's seat side wiper blade 18.

Note that in each of the exemplary embodiments of the present disclosure, the first output shaft 11A of the first motor 11 and the second output shaft 12A of the second motor 12 are controlled so as to be capable of rotating forward and backward (back and forth). However, there is no limitation thereto. For example, configuration may be made in which either the first output shaft 11A or the second output shaft 12A is rotated in one direction only.

Note that in each of the exemplary embodiments of the present disclosure, the rotation of the first output shaft 11A of the first motor 11 moves the driver's seat side wiper blade 18 and the front passenger seat side wiper blade 36 between the upper return positions P1D, P1P and the lower return positions P2D, P2P. However, there is no limitation thereto. For example, a structure may include a "driver's seat side first motor" and a "front passenger seat side first motor" corresponding to the first motor 11, such that the driver's seat side wiper blade 18 is moved between the upper return position P1D and the lower return position P2D by rotation of the driver's seat side first motor, and the front passenger seat side wiper blade 36 is moved between the upper return position P1P and the lower return position P2P by rotation of the front passenger seat side first motor.

Note that each of the exemplary embodiments of the present disclosure employ a structure in which the driver's seat side wiper blade 18 and the front passenger seat side wiper blade 36 do not overlap in the vehicle width direction at the lower return positions P2D, P2P. However, there is no limitation thereto. For example, the length of the driver's seat side wiper blade 18 side of the front passenger seat side wiper blade 36 may be increased. In other words, the length of the front passenger seat side wiper blade 36 may be set such that the driver's seat side wiper blade 18 side of the front passenger seat side wiper blade 36 overlaps with the front passenger seat side wiper blade 36 side of the driver's seat side wiper blade 18. This thereby enables a region at a central lower side of the windshield glass that cannot be wiped to be made smaller when moving back and forth to wipe the wiping range Z2.

Note that in each of the exemplary embodiments of the present disclosure, the front passenger seat side wiper arm 35 (front passenger seat side wiper blade 36) is controlled so as to extend until it reaches the vicinity of an intermediate angle of the predetermined rotation angle of the first output shaft 11A, and the front passenger seat side wiper arm 35 (front passenger seat side wiper blade 36) is controlled so as to retract between the vicinity of the intermediate angle and the predetermined rotation angle. However, there is no limitation thereto. For example, the front passenger seat side wiper arm 35 may be controlled so as to gradually extend as the front passenger seat side wiper blade 36 wipes from the lower return position P2P toward the upper return position P1P (when wiping on the outward path).

Note that in the present exemplary embodiment, explanation has been given regarding an embodiment in which the rotation angle of the first output shaft 11A of the first motor 11 and the rotation angle of the second output shaft 12A of the second motor 12 are employed. Alternatively, a rotation position of the first output shaft 11A and a rotation position of the second output shaft 12A may be employed.

Note that in each of the exemplary embodiments of the present disclosure, wiping of the changed wiping range is performed a predetermined number of times (at least once), after which processing returns to the beginning. However, there is no limitation thereto. For example, in cases in which dirt or the like is not removed from the non-wiped region X despite having wiped the changed wiping range a predetermined number of times (at least once), determination may be made that removal is not possible (due to freezing, or condensation on the inner surface), and control may be performed such that the wiping range is not changed for a predetermined period. With such control, the wiping range is not changed in cases in which, due to freezing or condensation on the inner surface, removal would not be possible even were the wiping range to be changed, thereby enabling distraction caused by the operation of the wiper device 2 to be suppressed.

Note that in each of the exemplary embodiments of the present disclosure, the first motor 11 and the second motor 12 are controlled so as to wipe the wiping range Z2 in a situation in which a broad field of view should be secured on the front passenger seat side. However, a separate "automatic change ON/OFF switch" capable of cancelling the execution of such control may be provided. Providing an automatic change ON/OFF switch enables the wiping range Z1 to be wiped without changing the wiping range even in situations in which a broad field of view should be secured on the front passenger seat side. Since the wiping range is not changed (the wiping range Z2 is not wiped) in cases in which an occupant of the vehicle 122 does not feel it is necessary to change the wiping range, operation of the wiper device 2 can be suppressed from distracting the occupant. The position of the automatic change ON/OFF switch is not limited, but the automatic change switch is preferably provided at a position close to the driver, for example on the steering wheel.

The disclosures of Japanese Patent Application Nos. 2016-008053 and 2016-194923 are incorporated in their entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A wiper device for a vehicle, the wiper device comprising:
   a driver's seat side wiper arm comprising a leading edge portion that is coupled to a first wiper blade, and a front passenger's seat side wiper arm comprising a leading edge portion that is coupled to a second wiper blade;
   a first motor that includes a first output shaft, that rotates the first output shaft to rotate the driver's seat side wiper arm and the front passenger's seat side wiper arm back and forth about pivot points of the respective wiper arms, and that causes the first wiper blade and the second wiper blade to perform a back and forth wiping operation between an upper return position and a lower return position on a windshield;
   a second motor that changes a wiping range on the windshield by the second wiper blade by moving the second wiper blade;
   a rotation angle detector that detects a rotation angle of the first output shaft; and
   a controller that controls the second motor according to the rotation angle of the first output shaft detected by the rotation angle detector in a state in which the vehicle is expected to turn toward a front passenger seat side.

2. The vehicle wiper device of claim 1, further comprising a position locator for the vehicle, the vehicle position locator computing a current position of the vehicle based on a signal received from a satellite, wherein
   in cases in which the current position computed by the vehicle position locator is within a predetermined distance of a center of a crossroad, the controller determines the state in which the vehicle is expected to turn toward the front passenger seat side to exist, and controls the second motor according to the rotation angle of the first output shaft.

3. The vehicle wiper device of claim 1, further comprising a position locator for the vehicle, the vehicle position locator computing a current position of the vehicle based on a signal received from a satellite, wherein
   the controller sets a route using a car navigation system that sets the route toward a predetermined point using map information and the current position computed by the vehicle position locator, and in cases in which the car navigation system issues an instruction to turn toward a front passenger seat side direction, the controller determines the state in which the vehicle is expected to turn toward the front passenger seat side to exist, and controls the second motor according to the rotation angle of the first output shaft.

4. The vehicle wiper device of claim 1, wherein in cases in which a signal input from a direction indicator switch of the vehicle indicates that the vehicle will turn toward the front passenger seat side, the controller determines the state in which the vehicle is expected to turn toward the front passenger seat side to exist, and controls the second motor according to the rotation angle of the first output shaft.

5. The vehicle wiper device of claim 1, wherein in cases in which a steering angle sensor of the vehicle detects a steering angle toward the front passenger seat side of the vehicle that is a threshold value or greater, the controller determines the state in which the vehicle is expected to turn toward the front passenger seat side to exist, and controls the second motor according to the rotation angle of the first output shaft.

6. The vehicle wiper device of claim 1, further comprising an imaging section that acquires an image looking ahead of the vehicle, wherein
   the controller extracts a boundary of a road from the image acquired by the imaging section, and in cases in which the extracted boundary indicates a bend in the road or a curve of the road toward the front passenger seat side, the controller determines the state in which the vehicle is expected to turn toward the front passenger seat side to exist, and controls the second motor according to the rotation angle of the first output shaft.

7. The vehicle wiper device of claim 1, further comprising a speed detector of the vehicle to detect a speed of the vehicle, wherein
   in the state in which the vehicle is expected to turn toward the front passenger seat side, the controller controls the second motor according to the rotation angle of the first output shaft in cases in which the vehicle speed detected by the vehicle speed detector is a threshold speed or greater.

8. The vehicle wiper device of claim 1, further comprising a cleaning liquid spray section that sprays cleaning liquid from a nozzle provided on the wiper arm, wherein
   in the state in which the vehicle is expected to turn toward the front passenger seat side, the controller controls the second motor according to the rotation angle of the first output shaft and controls the cleaning liquid spray section so as to spray cleaning liquid from the nozzle.

9. The vehicle wiper device of claim 1, further comprising:
   an imaging section that acquires image data relating to the windshield; and
   an optical detector that emits infrared light toward the windshield and detects adhered material on a surface of the windshield based on a reflected amount of the infrared light or a transmitted amount of the infrared light, wherein:
the imaging section and the optical detector are each provided on a vehicle cabin inside of the windshield at an upper portion of the front passenger seat side of the windshield; and
the controller determines the state in which the vehicle is expected to turn toward the front passenger seat side to exist based on the image data acquired by the imaging section and on a detection result of the optical detector, and controls the second motor according to the rotation angle of the first output shaft.

10. A control method for a wiper device of a vehicle, the vehicle wiper device control method comprising:
starting back and forth rotation of a first output shaft of a first motor that includes the first output shaft, that rotates the first output shaft to rotate a driver's seat side wiper arm and a front passenger's seat side wiper arm back and forth about pivot points of the respective wiper arms, and that causes a first wiper blade coupled to a leading edge portion of the driver's seat side wiper arm and a second wiper blade coupled to a leading edge portion of the front passenger's seat side wiper arm to perform a back and forth wiping operation between an upper return position and a lower return position on a windshield;
using a rotation angle detector to detect a rotation angle of the first output shaft; and
in a state in which the vehicle is expected to turn toward a front passenger seat side, starting rotation of a second output shaft of a second motor according to the rotation angle of the first output shaft detected by the rotation angle detector so as to rotate the second output shaft in a predetermined direction and change a wiping range on the windshield by the second wiper blade.

11. The vehicle wiper device control method of claim 10, further comprising computing a current position of the vehicle based on a signal received from a satellite, wherein
starting the rotation of the second output shaft includes determining the state in which the vehicle is expected to turn toward the front passenger seat side to exist and changing the wiping range on the windshield by the second wiper blade in cases in which the current position of the vehicle is within a predetermined distance of a center of a crossroad.

12. The vehicle wiper device control method of claim 10, further comprising computing a current position of the vehicle based on a signal received from a satellite, wherein
starting the rotation of the second output shaft includes setting a route using a car navigation system that sets the route toward a predetermined point using map information and the current position of the vehicle, and determining the state in which the vehicle is expected to turn toward the front passenger seat side to exist and changing the wiping range on the windshield by the second wiper blade in cases in which the car navigation system issues an instruction to turn toward a front passenger seat side direction.

13. The vehicle wiper device control method of claim 10, wherein starting the rotation of the second output shaft includes determining the state in which the vehicle is expected to turn toward the front passenger seat side to exist and changing the wiping range on the windshield by the second wiper blade in cases in which a signal input from a direction indicator switch of the vehicle indicates that the vehicle will turn toward the front passenger seat side.

14. The vehicle wiper device control method of claim 10, wherein starting the rotation of the second output shaft includes determining the state in which the vehicle is expected to turn toward the front passenger seat side to exist and changing the wiping range on the windshield by the second wiper blade in cases in which a steering angle toward the front passenger seat side of the vehicle detected by a steering angle sensor of the vehicle is a threshold value or greater.

15. The vehicle wiper device control method of claim 10, wherein starting the rotation of the second output shaft includes extracting a boundary of a road from an image looking ahead of the vehicle, and determining the state in which the vehicle is expected to turn toward the front passenger seat side to exist and changing the wiping range on the windshield by the second wiper blade in cases in which the extracted boundary indicates a bend in the road or a curve of the road toward the front passenger seat side.

16. The vehicle wiper device control method of claim 10, further comprising detecting a speed of the vehicle, wherein
starting the rotation of the second output shaft includes changing the wiping range on the windshield by the second wiper blade in cases in which the state in which the vehicle is expected to turn toward on the front passenger seat side has been determined to exist and in which the vehicle speed detected by performing the vehicle speed detection is a threshold speed or greater.

17. The vehicle wiper device control method of claim 10, further comprising spraying cleaning liquid from a nozzle provided on the wiper arm, wherein
starting the rotation of the second output shaft includes changing the wiping range on the windshield by the wiper blade and executing the cleaning liquid spraying in cases in which the state in which the vehicle is expected to turn toward the front passenger seat side has been determined to exist.

18. The vehicle wiper device control method of claim 10, wherein starting rotation of the second output shaft includes determining the state in which the vehicle is expected to turn toward the front passenger seat side to exist based on image data relating to the windshield acquired by an imaging section that is provided on a vehicle cabin inside of the windshield at an upper portion of a front passenger seat side of the windshield, and based on a detection result of an optical detector that is provided on the vehicle cabin inside of the windshield at an upper portion of a front passenger seat side of the windshield and that emits infrared light toward the windshield and detects adhered material on a surface of the windshield based on a reflected amount of the infrared light or a transmitted amount of the infrared light, and changing the wiping range on the windshield by the second wiper blade.

* * * * *